(12) United States Patent
Li et al.

(10) Patent No.: US 12,184,429 B2
(45) Date of Patent: Dec. 31, 2024

(54) METHOD FOR SENDING HYBRID AUTOMATIC REPEAT REQUEST ACKNOWLEDGEMENT/NEGATIVE ACKNOWLEDGEMENT INFORMATION AND APPARATUS

(71) Applicant: HUAWEI TECHNOLOGIES CO., LTD., Guangdong (CN)

(72) Inventors: Shengyu Li, Beijing (CN); Lei Guan, Beijing (CN); Ruixiang Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 17/706,874

(22) Filed: Mar. 29, 2022

(65) Prior Publication Data
US 2022/0224453 A1 Jul. 14, 2022

Related U.S. Application Data

(63) Continuation of application No. PCT/CN2019/109744, filed on Sep. 30, 2019.

(51) Int. Cl.
*H04L 1/1829* (2023.01)
*H04L 1/1812* (2023.01)

(52) U.S. Cl.
CPC ......... *H04L 1/1854* (2013.01); *H04L 1/1812* (2013.01); *H04L 1/1861* (2013.01)

(58) Field of Classification Search
None
See application file for complete search history.

(56) References Cited

U.S. PATENT DOCUMENTS

2019/0268803 A1 8/2019 He et al.

FOREIGN PATENT DOCUMENTS

| CN | 110086579 A | 8/2019 |
| CN | 110166214 A | 8/2019 |
| WO | 2018010268 A1 | 1/2018 |

OTHER PUBLICATIONS

Huawei et al: "Other issues an NR eMIMO in R16", 3GPP Draft; R1-1909319, Aug. 17, 2019, XP051765926, total 28 pages.
(Continued)

*Primary Examiner* — Jason E Mattis
*Assistant Examiner* — Bao G Nguyen

(57) ABSTRACT

A method and an apparatus for sending hybrid automatic repeat request acknowledgement/negative acknowledgement information are disclosed, and relate to the communications field, to specify a mechanism for feeding back information indicating whether a decoding result of downlink data repeatedly transmitted in a slot is correct. The method includes: determining a first downlink data occasion set based on a time domain resource indicated by a time domain resource allocation (TDRA) table; determining a first downlink data occasion based on a start time domain resource for sending downlink data; adding feedback information (for example, information indicating whether a decoding result of the downlink data is correct) to a feedback location corresponding to the first downlink data occasion; determining a feedback slot based on a slot to which the start time domain resource for sending the downlink data belongs and a first offset K1; and feeding back a HARQ-ACK codebook in the feedback slot.

20 Claims, 12 Drawing Sheets

(56) References Cited

OTHER PUBLICATIONS

Huawei et al: "UCI enhancements far URLLC", 3GPP Draft; R1-1900044, Jan. 20, 2019, XP051592970, total 8 pages.
Panasonic: "On multi-TRP enhancements for NR MIMO in Rel.16", 3GPP Draft; R1-1908972, Aug. 16, 2019, XP051765577, total 16 pages.
Huawei et al: "UCI enhancements for URLLC", 3GPP Draft; R1-1908052, Aug. 17, 2019, XP051764675, total 14 pages.
Intel Corporation: "On multi-TRP/multi-panel transmission", 3GPP Draft; R1-1908653, Aug. 17, 2019, XP051765261, total 24 pages.
Extended European Search Report issued in EP19947941.1, dated Aug. 2, 2022, 11 pages.
3GPP TS 38.213 V15.7.0 (Sep. 2019), 3rd Generation Partnership Project; Technical Specification Group Radio Access Network; NR; Physical layer procedures for control(Release 15), 108 pages.
Chinese Office Action for Application No. 201980100544 dated Apr. 26, 2023, 10 pages.
Panasonic, "HARQ enhancement for NR-U R1- 1906263", 3GPP TSG RAN WG1 #97s, May 17, 2019, total 9 pages.
Huawei et al., "UCI enhancements for URLLC R1-1906058", 3GPP TSG RAN WG1 Meeting #97, May 17, 2019, total 10 pages.
International Search Report and Written Opinion issued in PCT/CN2019/109744, dated Jun. 29, 2020, 9 pages.

METHOD FOR SENDING HYBRID AUTOMATIC REPEAT REQUEST ACKNOWLEDGEMENT/NEGATIVE ACKNOWLEDGEMENT INFORMATION AND APPARATUS

CROSS-REFERENCE TO RELATED APPLICATIONS

This application is a continuation of International Application No. PCT/CN2019/109744, filed on Sep. 30, 2019, the disclosure of which is hereby incorporated by reference in its entirety.

TECHNICAL FIELD

Embodiments of this application relate to the communications field, and in particular, to a method and an apparatus for sending hybrid automatic repeat request acknowledgement/negative acknowledgement information.

BACKGROUND

To cope with explosive growth of mobile data traffic, massive mobile communications device connections, and various emerging new services and application scenarios in the future, a fifth-generation (5G) mobile communications system emerges. For tactile interactive applications such as wireless control in an industrial manufacturing or production process, motion control of driverless cars and drones, remote repair, and remote surgery, the International Telecommunication Union (ITU) defines ultra reliable and low latency communications (URLLC). A URLLC service is mainly characterized by ultra-high reliability, a low latency, a relatively small data transmission amount, and burstiness.

To ensure ultra-high reliability and a low latency, downlink data may be repeatedly transmitted in a slot. Generally, after receiving downlink data, a terminal device needs to feed back, to a network device, information indicating whether a decoding result of the downlink data is correct. However, a current protocol does not specify a mechanism for feeding back information indicating whether a decoding result of downlink data repeatedly transmitted in a slot is correct.

SUMMARY

Embodiments of this application provide a method and an apparatus for sending hybrid automatic repeat request acknowledgement/negative acknowledgement information, and specify a mechanism for feeding back information indicating whether a decoding result of downlink data repeatedly transmitted in a slot is correct.

To achieve the foregoing objectives, the following technical solutions are disclosed.

According to a first aspect, an embodiment of this application provides a method for sending hybrid automatic repeat request acknowledgement/negative acknowledgement information. The method may be applied to a terminal device, or the method may be applied to a communications apparatus that can support the terminal device in implementing the method. For example, the communications apparatus includes a chip system. The method includes: determining a first downlink data occasion set based on a first time domain resource set, and determining a first downlink data occasion based on a first time domain resource, where the first time domain resource set includes N time domain resources, the first downlink data occasion set includes M downlink data occasions, the first time domain resource is a start time domain resource for repeatedly transmitting first downlink data K times in a time unit, the first time domain resource is any one of the N time domain resources, the first downlink data occasion is any one of the M downlink data occasions, both N and M are integers, N≥1, M≥1, M≤N, K is an integer, and K≥2; and generating a first codebook based on first feedback information, the first downlink data occasion, and the first downlink data occasion set, and sending the first codebook in a first feedback time unit, where the first feedback time unit is determined based on a first offset, the first feedback information is information indicating whether a decoding result of the first downlink data is correct, and the first offset is a difference between a number of a time unit for transmitting the first downlink data and a number of a time unit for feeding back the first codebook.

According to a second aspect, an embodiment of this application provides a method for receiving hybrid automatic repeat request acknowledgement/negative acknowledgement information. The method may be applied to a network device, or the method may be applied to a communications apparatus that can support the network device in implementing the method. For example, the communications apparatus includes a chip system. The method includes: determining a first downlink data occasion set based on a first time domain resource set, and determining a first downlink data occasion based on a first time domain resource, where the first time domain resource set includes N time domain resources, the first downlink data occasion set includes M downlink data occasions, the first time domain resource is a start time domain resource for repeatedly transmitting first downlink data K times in a time unit, the first time domain resource is any one of the N time domain resources, the first downlink data occasion is any one of the M downlink data occasions, both N and M are integers, N≥1, M≥1, M≤N, K is an integer, and K≥2; and receiving a first codebook in a first feedback time unit based on the first downlink data occasion set and the first downlink data occasion, where the first feedback time unit is determined based on a first offset, the first feedback information is information indicating whether a decoding result of the first downlink data is correct, and the first offset is a difference between a number of a time unit for transmitting the first downlink data and a number of a time unit for feeding back the first codebook.

According to the method for sending or receiving hybrid automatic repeat request acknowledgement/negative acknowledgement information provided in embodiments of this application, a start time domain resource for sending downlink data belongs to a time domain resource set (that is, the first time domain resource set) indicated by a preset time domain resource allocation (TDRA) table. Therefore, the first downlink data occasion belongs to the first downlink data occasion set. In this way, it can be ensured that feedback information of the first downlink data has a corresponding feedback location. For downlink data repeatedly transmitted in a slot, information indicating whether a decoding result is correct can be successfully fed back. Therefore, for downlink data repeatedly transmitted in a slot, this application proposes a new method for determining a downlink data occasion and a new method for determining a feedback information location (that is, an acknowledgement (ACK)/negative acknowledgement (NACK) bit, or an AN bit for short), so that codebook feedback can be performed semi-persistently in a new scenario.

In an example embodiment, the terminal device or the network device determines the first downlink data occasion set based only on the first time domain resource set, and does not determine the first downlink data occasion based on a time domain resource set occupied for K repeated transmissions. Optionally, the terminal device or the network device does not determine the first downlink data occasion set based on a time domain resource that is in a time domain resource set occupied for K repeated transmissions and that does not belong to the first time domain resource set. Therefore, a case in which feedback information of the first downlink data does not have a corresponding feedback location is avoided.

In another example embodiment, the terminal device or the network device determines the first downlink data occasion based only on the first time domain resource, and does not determine the first downlink data occasion based on any time domain resource other than the first time domain resource in a time domain resource set occupied for K repeated transmissions. This avoids a case in which feedback information of the first downlink data does not have a corresponding feedback location because a downlink data occasion corresponding to the first downlink data is not in the first downlink data occasion set determined based on the first time domain resource set.

In another example embodiment, at least one of time domain resources for repeatedly transmitting the first downlink data K times does not belong to the first time domain resource set, and lengths of K time domain resources are the same. In this case, if the terminal device or the network device determines the first downlink data occasion based on the at least one time domain resource, the first downlink data occasion definitely does not belong to the first downlink data occasion set. Therefore, it cannot be ensured that feedback information of the first downlink data has a corresponding feedback location.

In another example embodiment, the quantity K of repeated transmissions is semi-persistently indicated by a higher layer parameter, and this is compatible with slot-based repeated transmission. Alternatively, the quantity K of repeated transmissions is dynamically indicated by downlink control information (DCI), and the DCI is further used to schedule the first downlink data. In this way, different quantities of repetitions may be dynamically selected based on a data scheduling latency, a reliability requirement, and a location of the first time domain resource.

In another example embodiment, the quantity K of repetitions is semi-persistently indicated by a higher layer parameter, and values of quantities K of repetitions associated with different time domain resources in the first time domain resource set may be different. For example, each time domain resource in the first time domain resource set is associated with one specific quantity K of repetitions. In this way, an increase in DCI overheads caused by dynamically indicating a quantity of repetitions in the DCI is avoided, and different quantities of repetitions may be configured based on different time domain resource locations, so as to achieve a best compromise between overheads and flexibility.

In another example embodiment, transmission configuration indicators (TCIs) corresponding to at least two of time domain resources for repeatedly transmitting the first downlink data K times have different values. In this case, different transmissions of the first downlink data may be sent by different stations, so that a spatial diversity gain can be obtained, and a probability of successful data transmission can be improved.

In another example embodiment, M is equal to a maximum quantity of non-overlapping time domain resources included in the first time domain resource set, and each downlink data occasion in the first downlink data occasion set corresponds to at least one of the N time domain resources. In this way, it can be ensured that a feedback codebook determined based on the first downlink data occasion set may include feedback information of all possible downlink data transmissions. In addition, time domain resources that overlap in time domain correspond to only one feedback location, so that feedback overheads are minimized.

In another example embodiment, the first time domain resource belongs to at least one time domain resource corresponding to the first downlink data occasion.

In another example embodiment, the generating a first codebook based on first feedback information, the first downlink data occasion, and the first downlink data occasion set includes: generating a first feedback sequence based on the first downlink data occasion set, where each feedback location in the first feedback sequence has a correspondence with a downlink data occasion in the first downlink data occasion set; and adding the first feedback information to a feedback location corresponding to the first downlink data occasion, to generate the first codebook.

In another example embodiment, the time unit is a slot. In this way, the first downlink data is repeatedly transmitted in one slot. Therefore, a transmission latency can be shortened.

In another example embodiment, the terminal device determines that a feedback mode of the first downlink data is semi-persistent codebook feedback. The semi-persistent codebook feedback can ensure that a feedback codebook size is not affected by whether the network device actually sends data, so as to avoid an incorrect codebook size determined by the terminal device due to no detection of some DCI for scheduling data.

In another example embodiment, the network device indicates that a feedback mode of the first downlink data is semi-persistent codebook feedback.

According to a third aspect, an embodiment of this application provides a method for sending hybrid automatic repeat request acknowledgement/negative acknowledgement information. The method may be applied to a terminal device, or the method may be applied to a communications apparatus that can support the terminal device in implementing the method. For example, the communications apparatus includes a chip system. The method includes: determining a first time unit based on K time domain resources included in a second time domain resource set, determining a first downlink data occasion set based on the first time unit and a first time domain resource set, and determining a first downlink data occasion based on the second time domain resource set, where the K time domain resources are indicated time domain resources for repeatedly transmitting first downlink data K times in a second time unit, the second time unit includes the first time unit, the first time domain resource set includes N time domain resources, the first downlink data occasion set includes M downlink data occasions, both N and M are integers, N≥1, M≥1, M≤N, K is an integer, and K≥2; and generating a first codebook based on first feedback information, the first downlink data occasion, and the first downlink data occasion set, where the first feedback information is information indicating whether a decoding result of the first downlink data is correct, and sending the first codebook in a first feedback time unit, where the first feedback time unit is determined based on a first offset, and the first offset is a difference between a number of a time unit for transmitting the first downlink data and a number of a time unit for feeding back the first codebook.

According to a fourth aspect, an embodiment of this application provides a method for receiving hybrid automatic repeat request acknowledgement/negative acknowledgement information. The method may be applied to a network device, or the method may be applied to a communications apparatus that can support the network device in implementing the method. For example, the communications apparatus includes a chip system. The method includes:

determining a first time unit based on K time domain resources included in a second time domain resource set, determining a first downlink data occasion set based on the first time unit and a first time domain resource set, and determining a first downlink data occasion based on the second time domain resource set, where the K time domain resources are indicated time domain resources for repeatedly transmitting first downlink data K times in a second time unit, the second time unit includes the first time unit, the first time domain resource set includes N time domain resources, the first downlink data occasion set includes M downlink data occasions, both N and M are integers, N≥1, M≥1, M≤N, K is an integer, and K≥2; and receiving a first codebook in a first feedback time unit based on the first downlink data occasion set and the first downlink data occasion, where the first feedback time unit is determined based on a first offset, and the first offset is a difference between a number of a time unit for transmitting the first downlink data and a number of a time unit for feeding back the first codebook.

According to the method for sending or receiving hybrid automatic repeat request acknowledgement/negative acknowledgement information provided in embodiments of this application, for downlink data repeatedly transmitted in a slot, a semi-persistent codebook is fed back based on a sub-slot, and all repeated time domain resources in the first time domain resource set are segmented, to obtain a physical downlink shared channel (PDSCH) occasion, thereby ensuring that a PDSCH repeatedly transmitted last time has a corresponding PDSCH occasion. In addition, a feedback location in a feedback sequence is determined based on a time domain resource repeatedly transmitted last time, so that information indicating whether a decoding result is correct can be successfully fed back. Therefore, for downlink data repeatedly transmitted in a slot and a semi-persistent codebook fed back based on a sub-slot, this application proposes a new method for determining a downlink data occasion and a new method for determining a feedback information location (that is, an ACK/NACK bit, or an AN bit for short), so that codebook feedback can be performed semi-persistently in a new scenario.

In an example embodiment, the determining a first time unit based on K time domain resources included in a second time domain resource set includes: determining a time unit in which an end symbol of a target time domain resource in the second time domain resource set is located as the first time unit, where the target time domain resource is a $K^{th}$ time domain resource in the second time domain resource set. In this way, the terminal device determines a feedback time based on a last time domain resource, so that it can be ensured that the terminal device has sufficient time to receive and decode downlink data, or perform combined decoding based on receiving results of a plurality of repeated transmissions.

In another example embodiment, the determining a first time unit based on K time domain resources included in a second time domain resource set includes: determining a time unit in which an end symbol of a target time domain resource in the second time domain resource set is located as the first time unit, where the target time domain resource is a last time domain resource in time domain resources that are in the second time domain resource set and that are obtained after a conflict with an uplink symbol is removed, and a location of the uplink symbol is semi-persistently indicated by a higher layer parameter. In this way, if a time domain resource used for last transmission conflicts with the uplink symbol, both the terminal device and the network device know that the transmission is not sent, and the terminal device may determine a feedback time unit based on a time domain resource used for penultimate repeated transmission. This can ensure fast feedback of feedback information. In addition, if the last transmission conflicts with the uplink symbol, the time domain resource used for the transmission is considered as an invalid time domain resource and is not involved in determining a downlink data occasion according to the conventional technology, a feedback time unit determined based on the transmission is used to perform feedback on downlink data transmission in a time unit in which the transmission is performed. Consequently, it cannot be ensured that feedback information of the first downlink data has a corresponding feedback location.

In another example embodiment, the determining a first downlink data occasion set based on the first time unit and a first time domain resource set includes: determining a third time domain resource set based on the first time domain resource set and the quantity K of repetitions; determining a fourth time domain resource set based on the third time domain resource set and the first time unit; and determining the first downlink data occasion set based on the fourth time domain resource set. In this way, it is ensured that the third time domain resource set includes a new time domain resource that is caused by repeated transmission and that does not belong to the first time domain resource, so that it can be ensured that feedback information of the first downlink data has a feedback location. In addition, the fourth time domain resource set may include only a time domain resource whose end symbol belongs to the first time unit, so that feedback overheads are minimized.

In another example embodiment, the determining a first downlink data occasion based on the second time domain resource set includes: determining the first downlink data occasion based on the target time domain resource in the second time domain resource set; or determining a fifth time domain resource set, where any time domain resource in the fifth time domain resource set belongs to the second time domain resource set, and an end symbol is located in the first time unit, and determining one or more first downlink data occasions based on one or more time domain resources in the fifth time domain resource set. In this way, a downlink data occasion may be determined based on the target time domain resource, to determine a feedback location. A feedback location of another repeated time domain resource is filled with a NACK, and side information may be provided to assist decoding. Alternatively, one or more downlink data occasions may be determined based on one or more time domain resources belonging to the first time unit, to determine a plurality of feedback locations for redundant transmission, thereby improving feedback information transmission reliability.

In another example embodiment, the generating a first codebook based on first feedback information, the first downlink data occasion, and the first downlink data occasion set includes: generating a first feedback sequence based on the first downlink data occasion set, where each feedback location in the first feedback sequence has a correspondence with each downlink data occasion in the first downlink data occasion set; and adding the first feedback information to a feedback location corresponding to the first downlink data occasion, to generate the first codebook.

In another example embodiment, the determining a first feedback time unit based on a first offset includes: determining the first feedback time unit based on the first offset and a number of the first time unit.

In another example embodiment, the first time unit is a sub-slot, and the second time unit is a slot. In this way, it can be ensured that downlink data is repeatedly transmitted in a slot, thereby shortening a transmission latency. In addition, feedback information of the downlink data is transmitted in a sub-slot, and feedback information of a plurality of pieces of downlink data may be separately fed back in different sub-slots in one slot, thereby shortening a feedback latency.

In another example embodiment, the quantity K of repetitions is semi-persistently indicated by a higher layer parameter. This is compatible with existing slot-based repeated transmission.

In another example embodiment, the quantity K of repetitions is semi-persistently indicated by a higher layer parameter, and values of quantities K of repetitions associated with different time domain resources in the first time domain resource set may be different. For example, each time domain resource in the first time domain resource set is associated with one specific quantity K of repetitions. In this way, an increase in DCI overheads caused by dynamically indicating a quantity of repetitions in the DCI is avoided, and different quantities of repetitions may be configured based on different time domain resource locations, so as to achieve a best compromise between overheads and flexibility.

In another example embodiment, the terminal device determines that a feedback mode of the first downlink data is semi-persistent codebook feedback. The semi-persistent codebook feedback can ensure that a feedback codebook size is not affected by whether the network device actually sends data, so as to avoid an incorrect codebook size determined by the terminal device due to no detection of some DCI for scheduling data.

In another example embodiment, the network device indicates that a feedback mode of the first downlink data is semi-persistent codebook feedback.

According to a fifth aspect, an embodiment of this application further provides a communications apparatus. For beneficial effects, refer to the descriptions of the first aspect. Details are not described herein again. The communications apparatus has a function of implementing behavior in the method example in the first aspect. The function may be implemented by hardware, or may be implemented by hardware by executing corresponding software. The hardware or the software includes one or more modules corresponding to the foregoing function. In an example embodiment, the communications apparatus includes a transceiver unit and a processing unit. The processing unit is configured to determine a first downlink data occasion set based on a first time domain resource set, where the first time domain resource set includes N time domain resources, the first downlink data occasion set includes M downlink data occasions, both N and M are integers, N≥1, M≥1, and M≤N. The processing unit is further configured to determine a first downlink data occasion based on a first time domain resource, where the first time domain resource is a start time domain resource for repeatedly transmitting first downlink data K times in a time unit, the first time domain resource is any one of the N time domain resources, the first downlink data occasion is any one of the M downlink data occasions, K is an integer, and K≥2. The processing unit is further configured to generate a first codebook based on first feedback information, the first downlink data occasion, and the first downlink data occasion set, where the first feedback information is information indicating whether a decoding result of the first downlink data is correct. The processing unit is further configured to determine a first feedback time unit based on a first offset, where the first offset is a difference between a number of a time unit for transmitting the first downlink data and a number of a time unit for feeding back the first codebook. The transceiver unit is configured to send the first codebook in the first feedback time unit. These units may perform corresponding functions in the method example in the first aspect. For details, refer to the detailed descriptions in the method example. Details are not described herein again.

According to a sixth aspect, an embodiment of this application further provides a communications apparatus. For beneficial effects, refer to the descriptions of the second aspect. Details are not described herein again. The communications apparatus has a function of implementing behavior in the method example in the second aspect. The function may be implemented by hardware, or may be implemented by hardware by executing corresponding software. The hardware or the software includes one or more modules corresponding to the foregoing function. In an example embodiment, the communications apparatus includes a transceiver unit and a processing unit. The processing unit is configured to determine a first downlink data occasion set based on a first time domain resource set, where the first time domain resource set includes N time domain resources, the first downlink data occasion set includes M downlink data occasions, both N and M are integers, N≥1, M≥1, and M≤N. The processing unit is further configured to determine a first downlink data occasion based on a first time domain resource, where the first time domain resource is a start time domain resource for repeatedly transmitting first downlink data K times in a time unit, the first time domain resource is any one of the N time domain resources, the first downlink data occasion is any one of the M downlink data occasions, K is an integer, and K≥2. The processing unit is further configured to determine a first feedback time unit based on a first offset, where the first offset is a difference between a number of a time unit for transmitting the first downlink data and a number of a time unit for feeding back a first codebook, the first codebook is determined based on first feedback information, the first downlink data occasion, and the first downlink data occasion set, and the first feedback information is information indicating whether a decoding result of the first downlink data is correct. The transceiver unit is configured to receive the first codebook in the first feedback time unit based on the first downlink data occasion set and the first downlink data occasion. These modules may perform corresponding functions in the method example in the second aspect. For details, refer to the detailed descriptions in the method example. Details are not described herein again.

According to a seventh aspect, an embodiment of this application further provides a communications apparatus. For beneficial effects, refer to the descriptions of the third aspect. Details are not described herein again. The communications apparatus has a function of implementing behavior in the method example in the third aspect. The function may be implemented by hardware, or may be implemented by hardware by executing corresponding software. The hardware or the software includes one or more modules corresponding to the foregoing function. In an example embodiment, the communications apparatus includes a transceiver unit and a processing unit. The processing unit is configured to determine a first time unit based on K time domain resources included in a second time domain resource set, where the K time domain resources are indicated time domain resources for repeatedly transmitting first downlink data K times in a second time unit, the second time unit includes the first time unit, K is an integer, and K≥2. The processing unit is further configured to determine a first downlink data occasion set based on the first time unit and a first time domain resource set, where the first time domain resource set includes N time domain resources, the first downlink data occasion set includes M downlink data occasions, both N and M are integers, N≥1, M≥1, and M≤N. The processing unit is further configured to determine a first downlink data occasion based on the second time domain resource set. The processing unit is further configured to generate a first codebook based on first feedback information, the first downlink data occasion, and the first downlink data occasion set, where the first feedback information is information indicating whether a decoding result of the first downlink data is correct. The processing unit is further configured to determine a first feedback time unit based on a first offset, where the first offset is a difference between a number of a time unit for transmitting the first downlink data and a number of a time unit for feeding back the first codebook. The transceiver unit is configured to send the first codebook in the first feedback time unit. These modules may perform corresponding functions in the method example in the third aspect. For details, refer to the detailed descriptions in the method example. Details are not described herein again.

According to an eighth aspect, an embodiment of this application further provides a communications apparatus. For beneficial effects, refer to the descriptions of the fourth aspect. Details are not described herein again. The communications apparatus has a function of implementing behavior in the method example in the fourth aspect. The function may be implemented by hardware, or may be implemented by hardware by executing corresponding software. The hardware or the software includes one or more modules corresponding to the foregoing function. In an example embodiment, the communications apparatus includes a transceiver unit and a processing unit. The processing unit is configured to determine a first time unit based on K time domain resources included in a second time domain resource set, where the K time domain resources are indicated time domain resources for repeatedly transmitting first downlink data K times in a second time unit, the second time unit includes the first time unit, K is an integer, and K≥2. The processing unit is further configured to determine a first downlink data occasion set based on the first time unit and a first time domain resource set, where the first time domain resource set includes N time domain resources, the first downlink data occasion set includes M downlink data occasions, both N and M are integers, N≥1, M≥1, and M≤N. The processing unit is further configured to determine a first downlink data occasion based on the second time domain resource set. The processing unit is further configured to determine a first feedback time unit based on a first offset, where the first offset is a difference between a number of a time unit for transmitting the first downlink data and a number of a time unit for feeding back the first codebook. The transceiver unit is configured to receive a first codebook in the first feedback time unit based on the first downlink data occasion set and the first downlink data occasion, where the first codebook is determined based on first feedback information, the first downlink data occasion, and the first downlink data occasion set, and the first feedback information is information indicating a decoding result of the first downlink data. These modules may perform corresponding functions in the method example in the fourth aspect. For details, refer to the detailed descriptions in the method example. Details are not described herein again.

According to a ninth aspect, a communications apparatus is provided. The communications apparatus may be the terminal device in the foregoing method embodiments, or may be a chip disposed in the terminal device. The communications apparatus includes a communications interface and a processor, and optionally, further includes a memory. The memory is configured to store a computer program or instructions. The processor is coupled to the memory and the communications interface. When the processor executes the computer program or the instructions, the communications apparatus is enabled to perform the method performed by the terminal device in the foregoing method embodiments.

According to a tenth aspect, a communications apparatus is provided. The communications apparatus may be the network device in the foregoing method embodiments, or may be a chip disposed in the network device. The communications apparatus includes a communications interface and a processor, and optionally, further includes a memory. The memory is configured to store a computer program or instructions. The processor is coupled to the memory and the communications interface. When the processor executes the computer program or the instructions, the communications apparatus is enabled to perform the method performed by the network device in the foregoing method embodiments.

According to an eleventh aspect, a computer program product is provided. The computer program product includes computer program code, and when the computer program code is run, the method performed by the terminal device in the foregoing aspects is performed.

According to a twelfth aspect, a computer program product is provided. The computer program product includes computer program code, and when the computer program code is run, the method performed by the network device in the foregoing aspects is performed.

According to a thirteenth aspect, this application provides a chip system. The chip system includes a processor, configured to implement functions of the terminal devices in the methods in the foregoing aspects. In an example embodiment, the chip system further includes a memory, configured to store program instructions and/or data. The chip system may include a chip, or may include a chip and another discrete component.

According to a fourteenth aspect, this application provides a chip system. The chip system includes a processor, configured to implement functions of the network devices in the methods in the foregoing aspects. In an example embodiment, the chip system further includes a memory, configured to store program instructions and/or data. The chip system may include a chip, or may include a chip and another discrete component.

According to a fifteenth aspect, this application provides a computer-readable storage medium. The computer-readable storage medium stores a computer program. When the computer program is run, the method performed by the terminal device in the foregoing aspects is implemented.

According to a sixteenth aspect, this application provides a computer-readable storage medium. The computer-readable storage medium stores a computer program. When the computer program is run, the method performed by the network device in the foregoing aspects is implemented.

In this application, names of the terminal device, the network device, and the communications apparatus constitute no limitation on the device. During actual implementation, the devices may have other names. Provided that functions of the devices are similar to those of the devices in this application, the devices fall within the scope of the claims of this application and equivalent technologies thereof.

DESCRIPTION OF EMBODIMENTS

Figure 1:
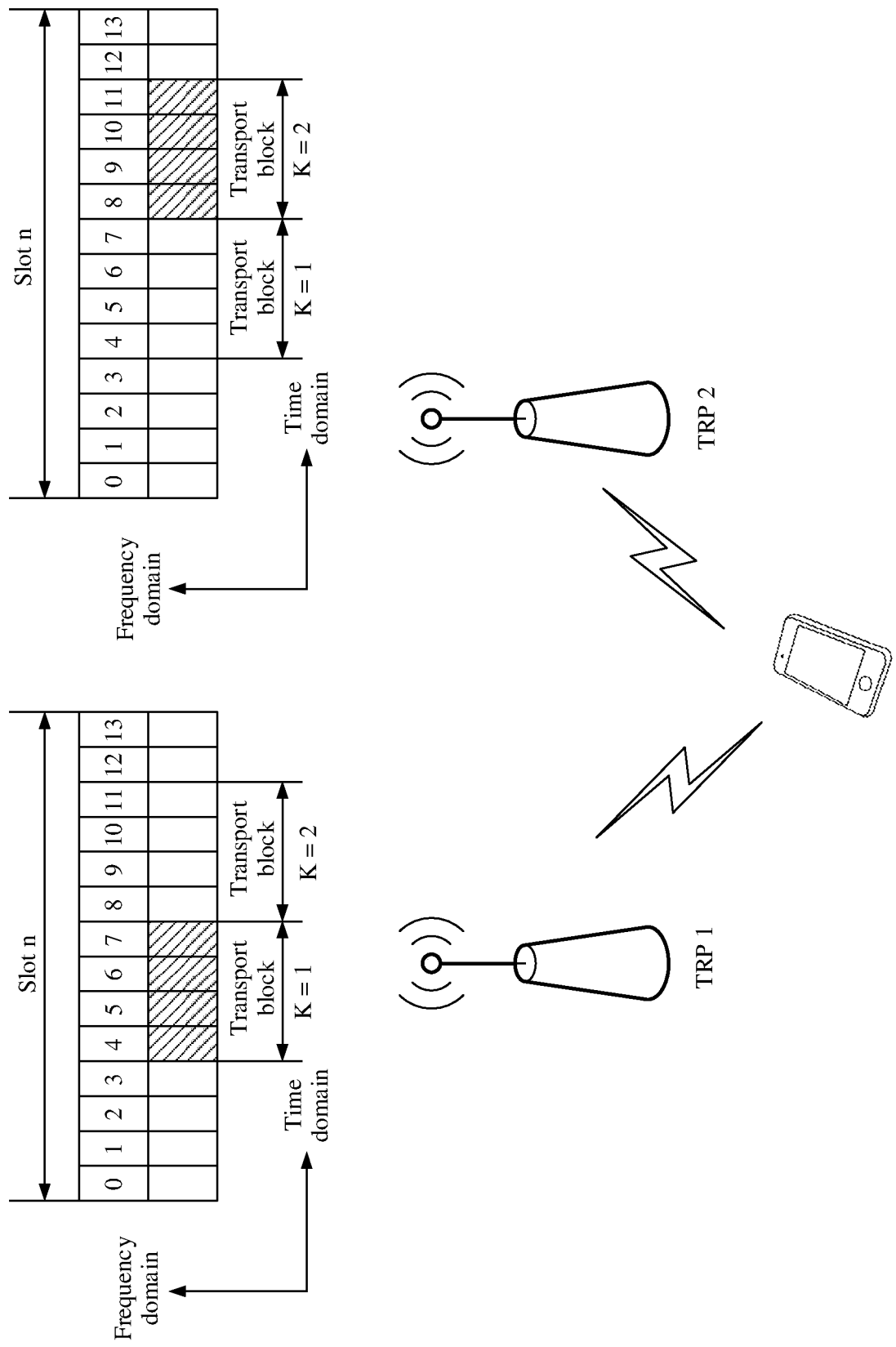
FIG. 1 is a simplified schematic diagram of a communications system according to an embodiment.

In the present disclosure, claims, and accompanying drawings of this application, the terms "first", "second", "third", and the like are intended to distinguish between different objects but do not limit a particular order.

In addition, in the present disclosure, the term "example" or "for example" is used to represent giving an example, an illustration, or a description. Any embodiment or design scheme described as "example" or "for example" in the present disclosure should not be explained as being more preferred or having more advantages than another embodiment or design scheme. The use of the term such as "example" or "for example" is intended to present a related concept in a specific manner.

For clear and concise description of the following embodiments, brief descriptions of related technologies are first provided.

Mobile communications technologies have profoundly changed people's lives, but people's pursuit of a higher-performance mobile communications technology has never stopped. To cope with explosive growth of mobile data traffic, massive mobile communications device connections, and various emerging new services and application scenarios in the future, a 5G mobile communications system emerges. The 5G mobile communications system is also referred to as a new radio access technology (NR) system. The ITU defines three types of application scenarios for 5G and future mobile communications systems: enhanced mobile broadband (eMBB), URLLC, and massive machine type communications (mMTC), a multimedia broadcast multicast service (MBMS), a location service, and the like. Deployment scenarios include an indoor hotspot scenario, a dense urban scenario, a suburban scenario, an urban macro scenario, a high-speed railway scenario, and the like.

Typical eMBB services include an ultra-high-definition video service, augmented reality (AR) service, a virtual reality (VR) service, and the like. These services are mainly characterized by a large data transmission amount and a high transmission rate.

Typical mMTC services include a smart power grid distribution automation service, a smart city service, and the like. These services are mainly characterized by a large quantity of networked devices, a relatively small data transmission amount, and insensitivity of data to a transmission latency. mMTC terminals need to meet requirements of low costs and a very long standby time.

Typical URLLC services include tactile interactive applications such as wireless control in an industrial manufacturing or production process, motion control of driverless cars and drones, remote repair, and remote surgery. These services are mainly characterized by ultra-high reliability, a low latency, a relatively small data transmission amount, and burstiness. For example, vehicle-to-everything (V2X) requires reliability of 99.999% and an end-to-end latency of 5 milliseconds (ms), power distribution requires reliability of 99.9999% and an end-to-end latency of 5 ms, and factory automation requires reliability of 99.9999% and an end-to-end latency of 2 ms.

A latency may be a transmission time required for a data packet to arrive from a service data unit (SDU) at a radio protocol stack layer 2/3 of a transmit end to an SDU at a radio protocol stack layer 2/3 of a receive end.

Reliability may be a success probability of correctly transmitting X-bit data to a receive end within duration. The duration may be a time required for a data packet to arrive from an SDU at a radio protocol stack layer 2/3 of a transmit end to an SDU at a radio protocol stack layer 2/3 of a receive end.

A system capacity may be a maximum cell throughput that can be reached by a system on the premise that a specific proportion of interrupted users are met. The interrupted user herein means that a reliability requirement of the interrupted user cannot be met within a specific latency range.

In a long term evolution (LTE) system, a minimum time scheduling unit is a transmission time interval (TTI) of a time length of 1 ms. 5G supports both a time-domain scheduling granularity at a time unit level and a time-domain scheduling granularity at a micro-time unit level, to meet latency requirements of different services. For example, a time unit is mainly used for an eMBB service, and a micro time unit is mainly used for a URLLC service. It should be noted that the time unit and the micro time unit are general terms. A specific example may be that the time unit may be referred to as a slot, and the micro time unit may be referred to as a micro slot, non-slot-based, a mini-slot, or a symbol; or the time unit may be referred to as a subframe, and the micro time unit may be referred to as a micro subframe. Other similar time domain resource division manners are not limited. In this application, a slot and a mini-slot are used as examples for description below. One slot may include, for example, 14 time domain symbols, and a quantity of time domain symbols included in one mini-slot is less than 14, for example, 2, 3, 4, 5, 6, or 7. Alternatively, one slot may include, for example, seven time domain symbols, and a quantity of time domain symbols included in one mini-slot is less than 7, for example, 2 or 4. A specific value is not limited. The "time domain symbol" herein may be an orthogonal frequency division multiplexing (OFDM) symbol. A slot whose subcarrier spacing is 15 kilohertz (kHz) includes 14 time domain symbols, and a corresponding time length is 1 ms. A slot whose subcarrier spacing is 60 kHz includes 12 or 14 time domain symbols, a corresponding time length is shortened to 0.25 ms.

To ensure ultra-high reliability and a low latency, downlink data may be repeatedly transmitted in a slot. Because wireless communication is characterized by deep attenuation and shadow, it is difficult to ensure high reliability even if one station is used to transmit a URLLC service at a very low transmission bit rate. Therefore, a multi-transmission and reception point (M-TRP) technology is introduced in R16. In this technology, a plurality of TRPs repeatedly transmit a PDSCH, to avoid a data transmission failure caused by factors such as deep attenuation and shadow on a link. There are many solutions for repeatedly sending the PDSCH in the M-TRP. However, a simplest and most natural solution is to repeat the PDSCH in time domain. To shorten a latency, R16 proposes an intra-slot repetition solution. In some embodiments, as shown in FIG. 1, a TRP 1 and a TRP 2 repeatedly transmit downlink data twice in a slot n.

Figure 2:
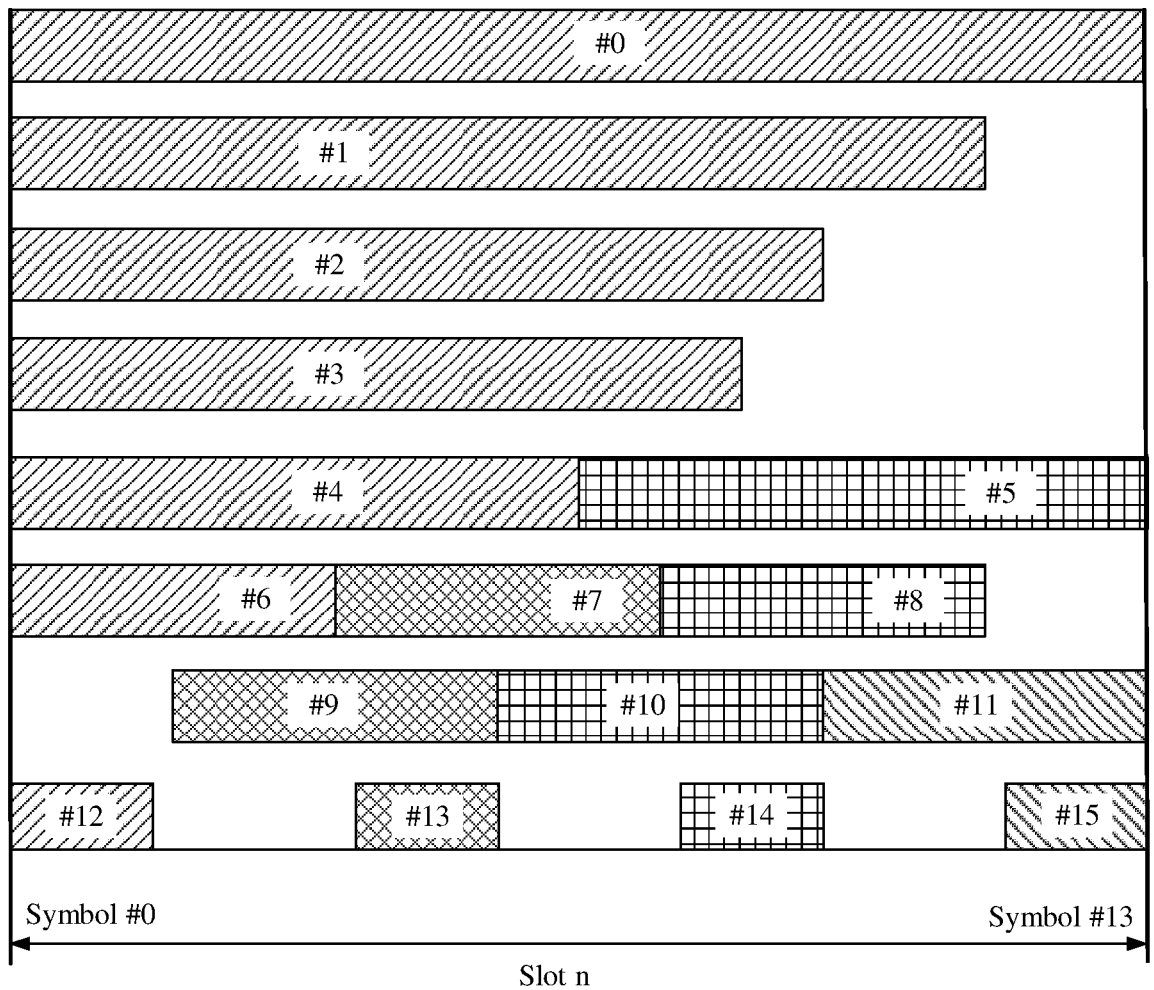
FIG. 2 is an example diagram of a Start and Length Indicator value (SLIV) in one slot according to an embodiment.

According to NR, a downlink data scheduling and transmission mechanism is based on a TDRA table configured by a higher layer. The TDRA table includes N values, and each value corresponds to an offset K0 and an SLIV in one slot, where N is an integer, and N≥1. It should be understood that the SLIV is a time domain location at which a terminal device sends a PDSCH in a slot, and the time domain resource may include at least one OFDM symbol. For example, FIG. 2 is an example diagram of an SLIV in one slot. One slot includes 16 time domain resources for sending a PDSCH. Specifically, a network device may select a time domain resource location from the TDRA table to carry the PDSCH. In addition, the terminal device needs to feed back information indicating whether the PDSCH is correctly received.

NR supports a feedback-based retransmission mechanism, that is, a hybrid automatic repeat request (HARQ). For example, the terminal device may feed back a transmission result of the PDSCH carrying downlink data. If the terminal device does not receive DCI for scheduling the PDSCH, the terminal device does not receive the PDSCH, and does not feed back a receiving result. If the terminal device receives DCI for scheduling the PDSCH, but the PDSCH is not successfully received (for example, a decoding result is incorrect), the terminal device feeds back a NACK to the network device. If the terminal device receives DCI for scheduling the PDSCH, and the PDSCH is successfully received (for example, a decoding result is correct), the terminal device feeds back an ACK to the network device.

A time unit (for example, a slot or a sub-slot) in which the terminal device feeds back the ACK or the NACK to the network device is determined based on a time unit in which the PDSCH is located (that is, a reference time unit, for example, a slot #n) and an offset K1. For example, the time unit in which the terminal device feeds back the ACK or the NACK to the network device is the slot #(n+K1).

The terminal device feeds back the ACK or the NACK through a physical uplink control channel (PUCCH) or a physical uplink shared channel (PUSCH). This application is described by using an example in which the terminal device uses the PUCCH. A PUCCH resource is indicated by DCI or configured by a higher layer parameter.

Due to the introduction of a time division duplex (TDD) frame structure, feedback information of the PDSCH in a plurality of downlink time units may be fed back in only one uplink time unit. Similarly, when carrier aggregation (CA) is introduced, PDSCHs on a plurality of carriers (CC) need to be fed back on one uplink CC. Due to these factors, the terminal device may add feedback information ACK/NACK (or AN for short) of a plurality of PDSCHs to a same uplink time unit (a same PUCCH resource). Herein, a HARQ-ACK codebook is a combination (including a quantity and a sequence) of the feedback information ACK/NACK of the plurality of PDSCHs. 5G NR supports a dynamic codebook and a semi-persistent codebook. A concept of the dynamic codebook means that the terminal device performs ACK/NACK feedback only on an actually scheduled PDSCH whose K1 indicates a current time unit (for example, a current PUCCH resource). An additional mechanism is required to ensure that when the terminal device misses detecting DCI for scheduling data, the terminal device still knows that detection of the DCI is missed, and needs to feed back a NACK at a corresponding location. However, this mechanism is not perfect, and the dynamic codebook naturally poses a risk on no detection of the DCI. Therefore, NR supports the semi-persistent codebook. A concept of the semi-persistent codebook means that an ACK/NACK is fed back for each PDSCH that may be scheduled and whose K1 may indicate a current time unit (for example, a current PUCCH resource). The semi-persistent codebook may also be referred to as a type 1 HARQ-ACK codebook.

Figure 3:
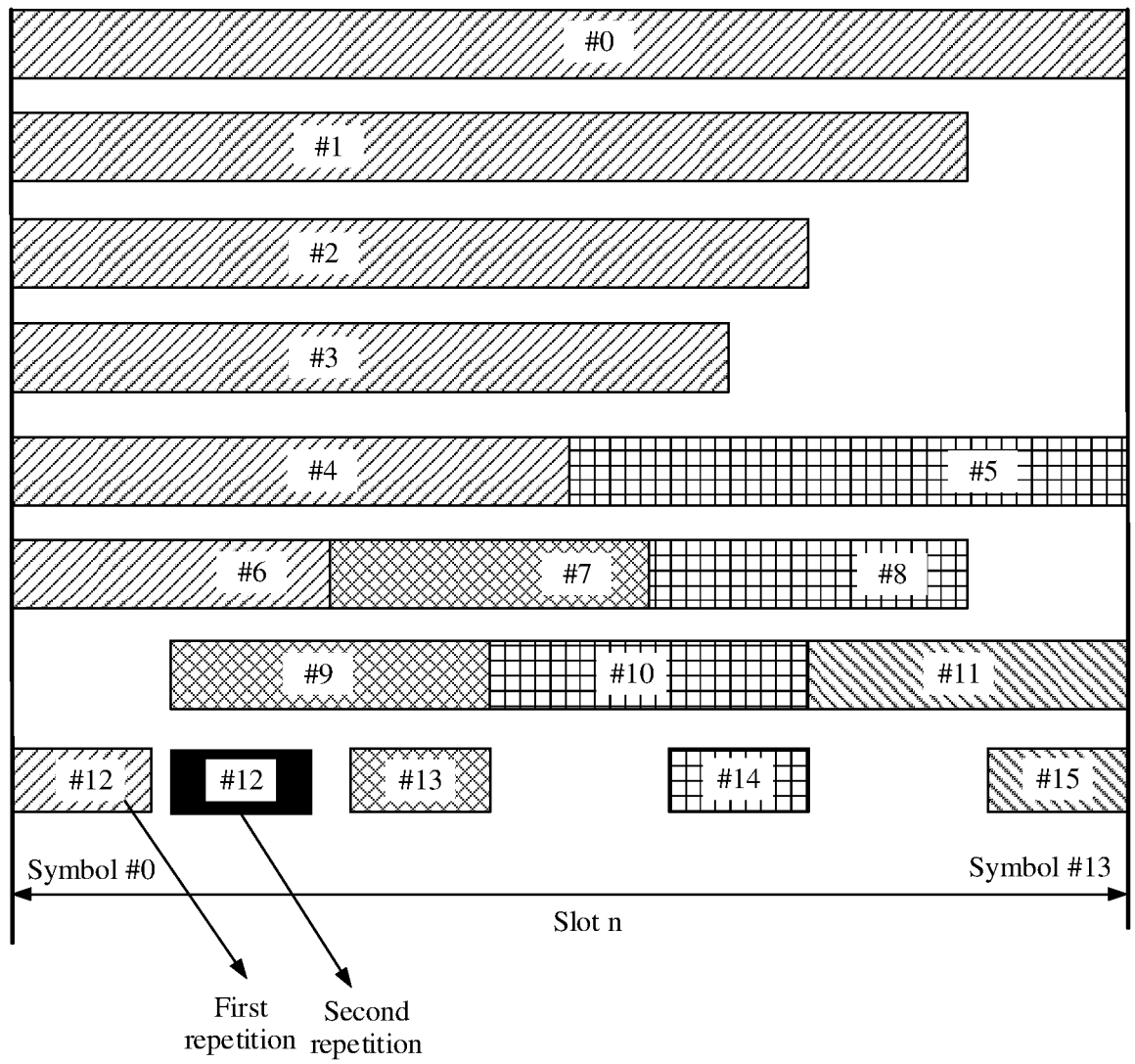
FIG. 3 is a schematic diagram of a time domain resource according to an embodiment.

For the semi-persistent codebook, codebook generation and a PDSCH feedback bit are also determined based on a TDRA table configured by a higher layer. However, once intra-slot repeated transmission is introduced in the M-TRP, a time domain location at which repeated transmission is performed may not be on a resource specified in the TDRA table configured by the higher layer. Consequently, the HARQ-ACK codebook cannot be fed back. For example, as shown in FIG. 3, a time domain resource indicated by SLIV #12 is used to repeatedly send downlink data twice, and a time domain resource indicated by SLIV #12 and used to repeatedly send downlink data for the second time is not the resource specified in the TDRA table (shown by black shading in the figure). In this way, generation of the semi-persistent codebook needs to be adaptively changed. However, a current protocol does not specify a mechanism for performing feedback on downlink data repeatedly transmitted in a slot.

To resolve the foregoing problem, an embodiment of this application provides a method for sending hybrid automatic repeat request acknowledgement/negative acknowledgement information. The method includes: determining a first downlink data occasion set based on a time domain resource set indicated by a TDRA table, determining a first downlink data occasion based on a start time domain resource for sending downlink data, and adding feedback information (for example, information indicating whether a decoding result of the downlink data is correct) to a feedback location corresponding to the first downlink data occasion. In addition, a feedback slot is determined based on a slot to which the start time domain resource for sending the downlink data belongs and an offset K1, and a HARQ-ACK/NACK is fed back in the feedback slot.

According to the method for sending hybrid automatic repeat request acknowledgement/negative acknowledgement information provided in embodiments of this application, a start time domain resource for sending downlink data belongs to a time domain resource set (that is, the first time domain resource set) indicated by a preset TDRA. Therefore, the first downlink data occasion belongs to the first downlink data occasion set. In this way, it can be ensured that feedback information of the first downlink data has a corresponding feedback location. For downlink data repeatedly transmitted in a slot, information indicating whether a decoding result is correct can be successfully fed back. Therefore, for downlink data repeatedly transmitted in a slot, this application proposes a new method for determining a downlink data occasion and a new method for determining a feedback information location, so that codebook feedback can be performed semi-persistently in a new scenario.

The following describes implementations of embodiments of this application in detail with reference to the accompanying drawings.

Figure 4:
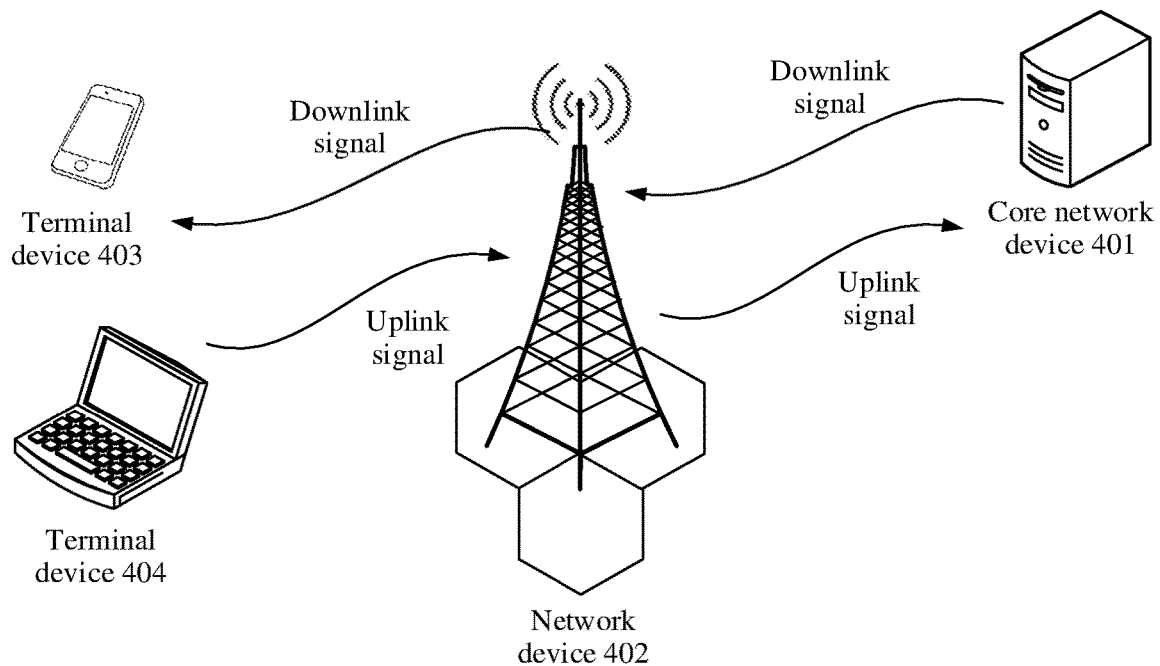
FIG. 4 is a schematic diagram of an architecture of a mobile communications system according to an embodiment.

FIG. 4 is an example diagram of an architecture of a mobile communications system to which an embodiment of this application may be applied. As shown in FIG. 4, the mobile communications system includes a core network device 401, a network device 402, and at least one terminal device (a terminal device 403 and a terminal device 404 shown in FIG. 4). The terminal device is connected to the network device wirelessly, and the network device is connected to the core network device wirelessly or wiredly. The core network device and the network device may be different physical devices independent of each other, or functions of the core network device and logical functions of the network device may be integrated into a same physical device, or some of functions of the core network device and some of functions of the network device may be integrated into one physical device. The terminal device may be located at a fixed location, or may be mobile. FIG. 4 is merely a schematic diagram. The mobile communications system may further include other network devices, for example, a wireless relay device and a wireless backhaul device, which are not drawn in FIG. 4. Quantities of core network devices, network devices, and terminal devices included in the mobile communications system are not limited in embodiments of this application.

The network device is an access device that is used by the terminal device to access the mobile communication system wirelessly, and may be a base station, an evolved NodeB (eNodeB), a transmission reception point (TRP), a next generation NodeB (gNB) in a 5G mobile communications system, a base station in a future mobile communications system, an access node in a WiFi system, or the like. The network device may alternatively be a module or a unit that completes some functions of the base station, for example, may be a central unit (CU), or may be a distributed unit (DU). A specific technology and a specific device form used by a radio access network device are not limited in embodiments of this application. In the present disclosure, the radio access network device is referred to as a network device for short. Unless otherwise specified, network devices are all radio access network devices.

The terminal device may also be referred to as a terminal, user equipment (UE), a mobile station (MS), a mobile terminal (MT), or the like. The terminal device may be a mobile phone, a pad, a computer with a wireless transceiver function, a virtual reality (VR) terminal device, an augmented reality (AR) terminal device, a wireless terminal in industrial control, a wireless terminal in self-driving, a wireless terminal in remote medical surgery, a wireless terminal in smart grid, a wireless terminal in transportation safety, a wireless terminal in smart city, a wireless terminal in smart home, or the like. A specific technology and a specific device form that are used by the terminal device are not limited in embodiments of this application.

Figure 5:
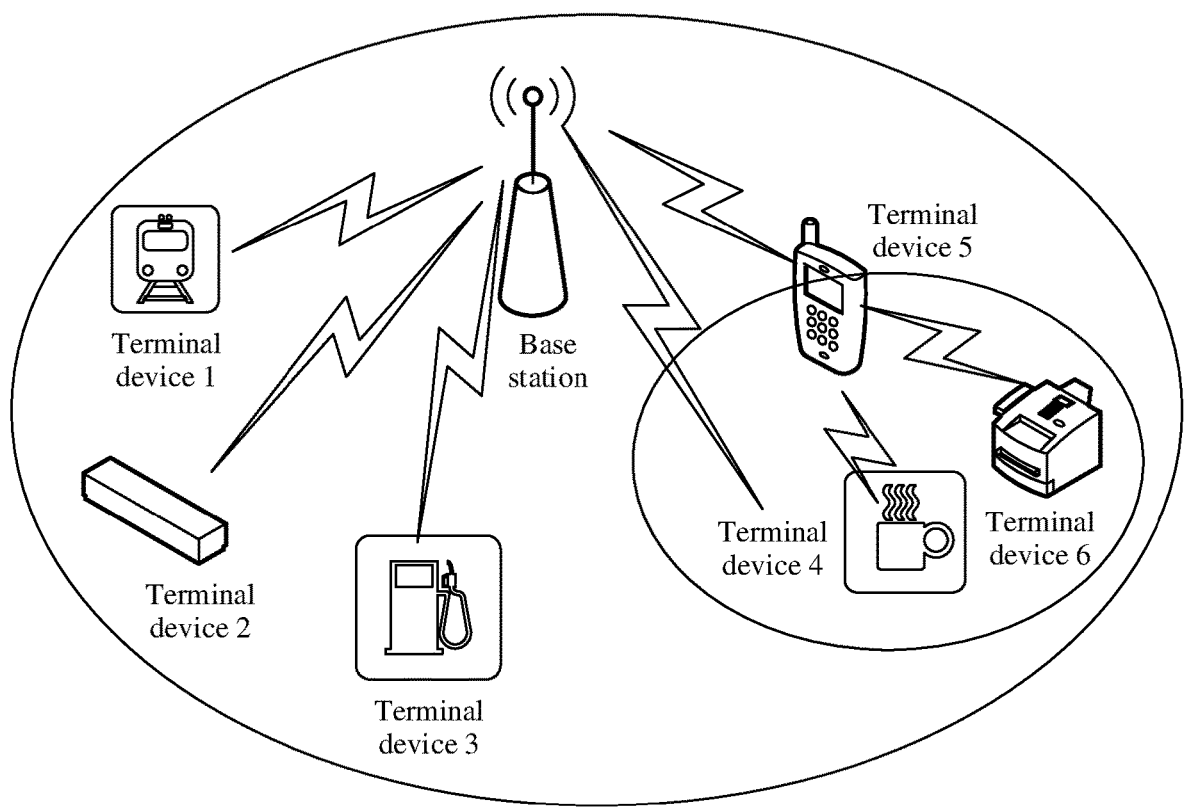
FIG. 5 is a schematic diagram of an architecture of a mobile communications system according to an embodiment.

This application is mainly applied to a 5G NR system. This application may alternatively be applied to another communications system, provided that the communications system includes an entity that needs to send transmission direction indication information, and includes another entity that needs to receive the indication information and determine a transmission direction within a period of time based on the indication information. For example, FIG. 5 is a schematic diagram of a communications system according to an embodiment of this application. As shown in FIG. 5, a base station and a terminal device 1 to a terminal device 6 constitute a communications system. In the communications system, the terminal device 1 to the terminal device 6 may send uplink data to the base station, and the base station receives the uplink data sent by the terminal device 1 to the terminal device 6. Alternatively, the base station may send downlink data to the terminal device 1 to the terminal device 6, and the terminal device 1 to the terminal device 6 receive the downlink data. In addition, the terminal device 4 to the terminal device 6 may also constitute a communications system. In the communications system, the terminal device 5 may receive uplink information sent by the terminal device 4 or the terminal device 6, and the terminal device 5 sends downlink information to the terminal device 4 or the terminal device 6.

The network device and the terminal device may be deployed on the land, including an indoor device, an outdoor device, a handheld device, or a vehicle-mounted device; may be deployed on the water; or may be deployed on an airplane, a balloon, and a satellite in the air. Application scenarios of the network device and the terminal device are not limited in embodiments of this application.

Communication between the network device and the terminal device may be performed by using a licensed spectrum, or may be performed by using an unlicensed spectrum, or may be performed by using both a licensed spectrum and an unlicensed spectrum. The network device and the terminal device may communicate with each other by using a spectrum below 6 gigahertz (GHz), or may communicate with each other by using a spectrum above 6 GHz, or may communicate with each other by using both a spectrum below 6 GHz and a spectrum above 6 GHz. A spectrum resource used between the network device and the terminal device is not limited in embodiments of this application.

In embodiments of this application, a time domain symbol may be an OFDM symbol, or may be a single-carrier frequency division multiplexing (SC-FDM) symbol. Unless otherwise specified, symbols in embodiments of this application are all time-domain symbols.

It may be understood that, in embodiments of this application, a PDSCH, a physical downlink control channel (PDCCH), and a PUSCH are only used as examples of a downlink data channel, a downlink control channel, and an uplink data channel. In different systems and different scenarios, a data channel and a control channel may have different names. This is not limited in embodiments of this application.

Figure 6:
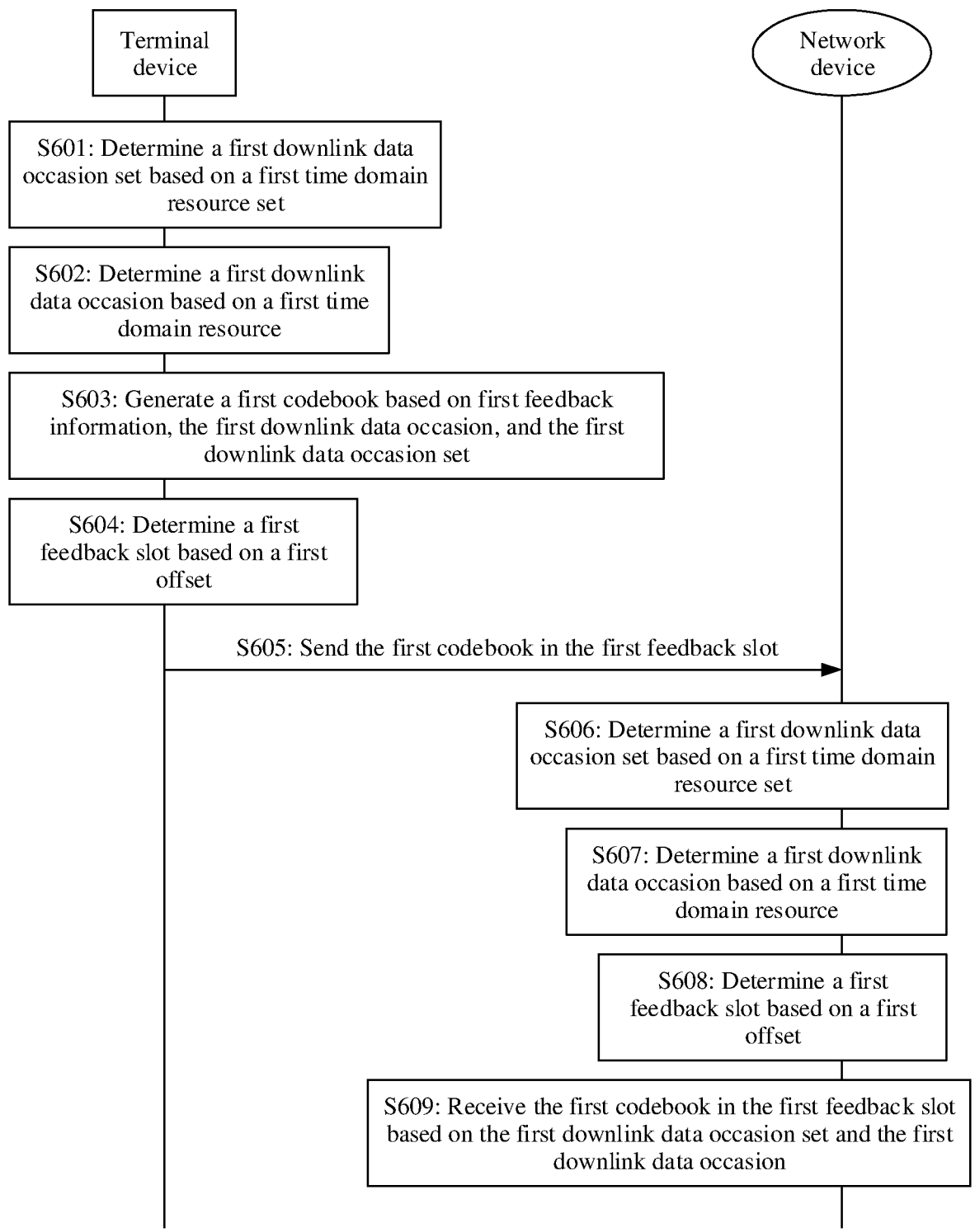
FIG. 6 is a flowchart of a method for sending hybrid automatic repeat request acknowledgement/negative acknowledgement information according to an embodiment.

The following describes in detail a method for sending hybrid automatic repeat request acknowledgement/negative acknowledgement information. FIG. 6 is a flowchart of a method for sending hybrid automatic repeat request acknowledgement/negative acknowledgement information according to an embodiment of this application. It is assumed herein that a time unit is a slot. Time domain resources required for repeatedly transmitting data based on a slot are in one slot, so that a transmission latency can be shortened. As shown in FIG. 6, the method may include the following steps.

S601: A terminal device determines a first downlink data occasion set based on a first time domain resource set.

In some embodiments, the terminal device may determine the first time domain resource set based on a preset TDRA table. Generally, the TDRA table includes N values, and each value corresponds to an offset K0 and an SLIV in one slot, where N is an integer, and N≥1. It should be understood that the SLIV is a time domain resource used by the terminal device to send a PDSCH in the slot. Therefore, the first time domain resource set includes N time domain resources, and the time domain resource is a time domain location at which the terminal device sends a PDSCH in one slot. For example, the time domain resource shown in FIG. 2 may be a time domain resource included in the first time domain resource set.

For each potential time domain resource for sending a PDSCH included in the first time domain resource set, the terminal device sequentially traverses N SLIVs configured by a higher layer. Each SLIV corresponds to an offset K0 and a time domain location for sending a PDSCH in one slot. If an SLIV meets a preset condition (for example, a slot in which a PDCCH calculated based on K0 is located may be used to schedule a PDSCH, or a location of the SLIV does not conflict with an uplink symbol in a DL-UL configuration), the SLIV is considered as a valid SLIV.

The terminal device performs counting once for valid SLIVs that overlap in one slot. In some embodiments, the terminal device may segment, based on a start symbol or an end symbol of the time domain resource, the N time domain resources included in the first time domain resource set, to obtain potential PDSCH occasions in a slot for sending a PDSCH. Each PDSCH occasion obtained after the segmentation corresponds to a plurality of overlapping valid SLIVs, but only one of these overlapping valid SLIVs can be transmitted at most, and therefore corresponds to one ACK/NACK feedback. Therefore, the first downlink data occasion set is obtained by segmenting the N time domain resources included in the first time domain resource set. The first downlink data occasion set includes M downlink data occasions, M is an integer, M≥1, and M≤N. M is equal to a maximum quantity of non-overlapping time domain resources included in the first time domain resource set. Each downlink data occasion in the first downlink data occasion set corresponds to at least one of the N time domain resources. In this way, it can be ensured that a feedback codebook determined based on the first downlink data occasion set may include feedback information of all possible downlink data transmissions. In addition, time domain resources that overlap in time domain correspond to only one feedback location, so that feedback overheads are minimized.

Figure 7:
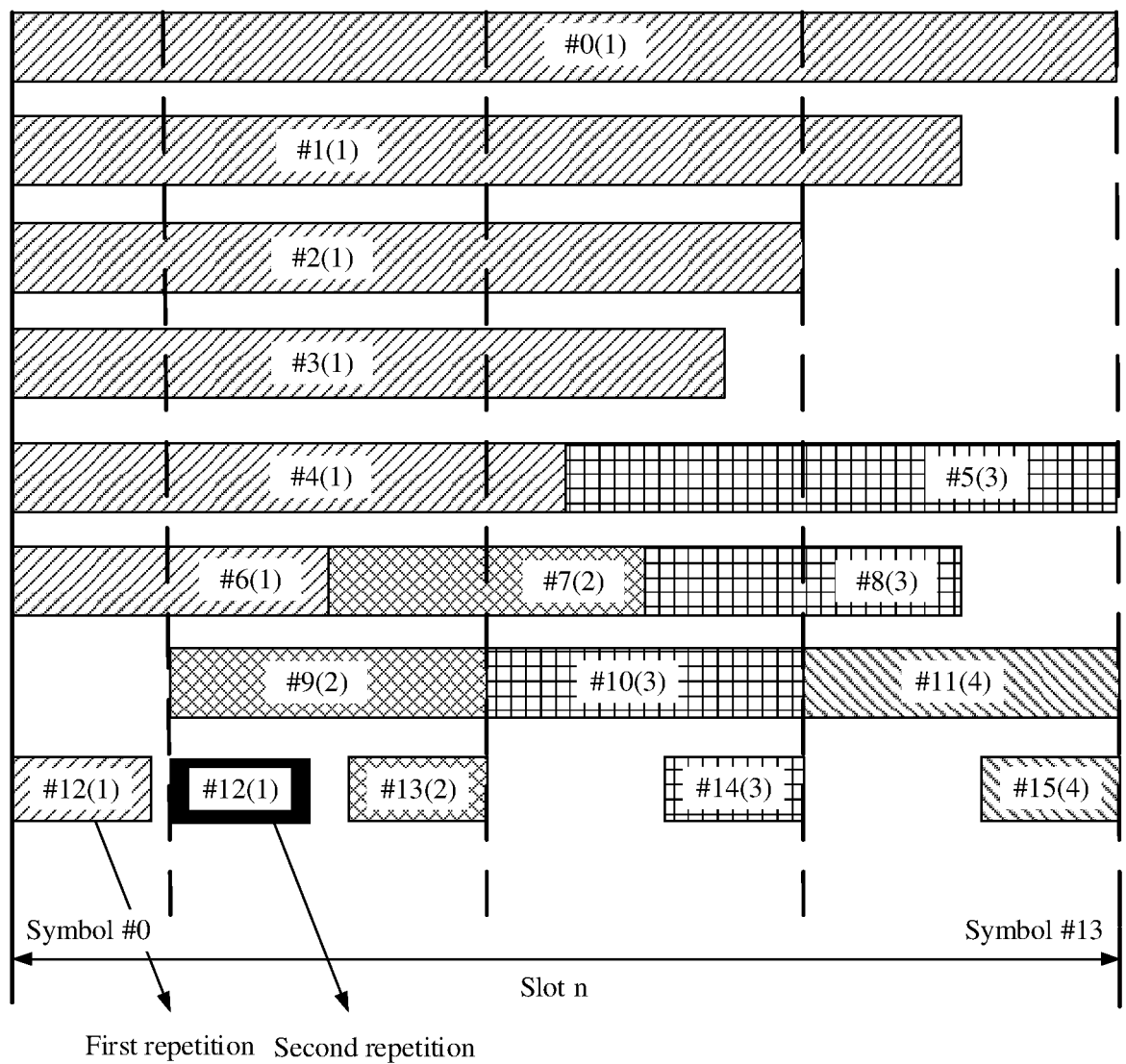
FIG. 7 is a schematic diagram of time domain resource division according to an embodiment.

For example, as shown in FIG. 7, it is assumed that the TDRA table includes 16 SLIVs (for example, SLIV #0 to SLIV #15), and SLIV #0 to SLIV #15 are all valid SLIVs. It may be understood that SLIV #0 to SLIV #15 may be a segment of time domain resources in one slot. The first time domain resource set includes time domain resources indicated by SLIV #0 to SLIV #15. Segmentation is performed based on end locations of SLIV #0 to SLIV #15, to obtain four PDSCH occasions, which correspond to numbers in parentheses ( ). The first PDSCH occasion includes the SLIVs {#0, #1, #2, #3, #4, #6, #12}. The second PDSCH occasion includes {#7, #9, #13}. The third PDSCH occasion includes {#5, #8, #10, #14}. The fourth PDSCH occasion includes {#11, #15}.

Therefore, the terminal device may determine an offset K0 from a PDCCH to a PDSCH in a slot and a potential value set (that is, the first time domain resource set) of an SLIV, a time domain location, of the PDSCH based on the TDRA table. A maximum quantity of ACKs/NCKs that need to be fed back in each slot is determined based on the foregoing information.

In some embodiments, the TDRA table may be preset, that is, may be predefined or configured by a higher layer parameter. "Predefined" may be understood as "predefined in a standard or a protocol". The terminal device and a network device need to prestore the predefined TDRA table. When the terminal device needs to feed back a HARQ-ACK codebook, the terminal device may obtain the TDRA table locally.

Figure 8:
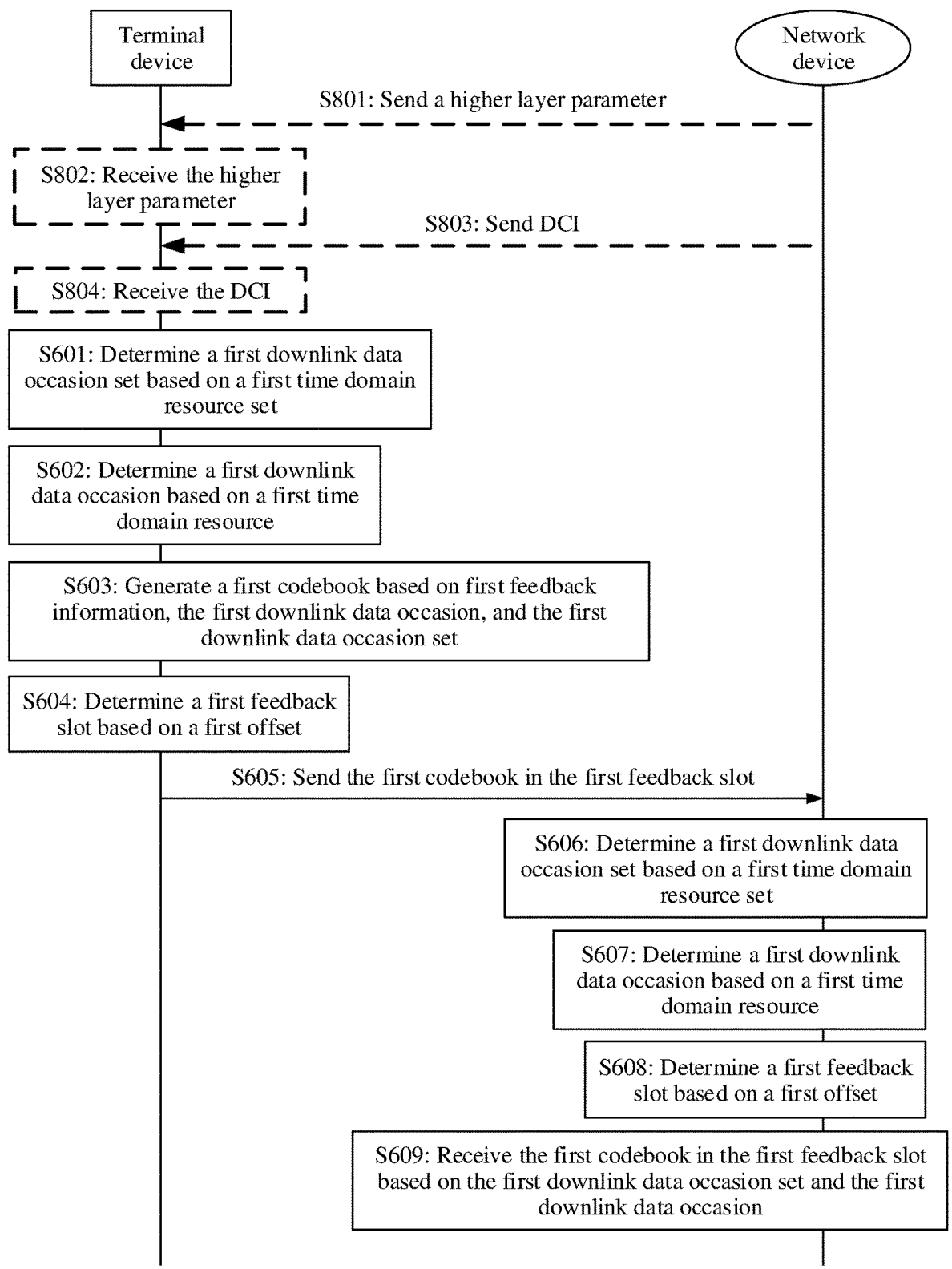
FIG. 8 is a flowchart of a method for sending hybrid automatic repeat request acknowledgement/negative acknowledgement information according to an embodiment.

For example, as shown in FIG. 8, before the terminal device determines the first downlink data occasion set based on the first time domain resource set, that is, before S601, the method further includes the following steps:

S801: The network device sends a higher layer parameter to the terminal device.

S802: The terminal device receives the higher layer parameter sent by the network device.

The higher layer parameter indicates the TDRA table. The higher layer parameter may be RRC signaling.

For example, the higher layer parameter may further indicate the terminal device to perform semi-persistent codebook feedback.

For example, the higher layer parameter may further indicate that a granularity of a feedback offset K1 of a HARQ-ACK is a slot.

For example, the higher layer parameter may further indicate the terminal device to perform intra-slot repetition (intra-slot PDSCH repetition).

For example, the higher layer parameter may further indicate a quantity K of repetitions. Optionally, the higher layer parameter used to indicate the quantity K of repetitions and the higher layer parameter used to indicate the TDRA table are two different parameters, and the quantity K of repetitions is applicable to all SLIVs in the TDRA table. Optionally, the higher layer parameter used to indicate the quantity K of repetitions and the higher layer parameter used to indicate the TDRA table are a same parameter. For example, each SLIV in the TDRA table is associated with one quantity K of repetitions, and quantities K of repetitions associated with different SLIVs may be the same or different. K is an integer, and K≥2.

S602: The terminal device determines a first downlink data occasion based on a first time domain resource.

The first time domain resource is a start time domain resource for repeatedly transmitting first downlink data K times in a slot. It should be understood that the first time domain resource is any one of the N time domain resources included in the first time domain resource set. The first downlink data occasion is any one of the M downlink data occasions included in the first downlink data occasion set.

In some embodiments, the terminal device may determine, through PDCCH blind detection, that there is a PDCCH sent to the terminal device in a slot, obtain, by parsing DCI carried by the PDCCH, information about a PDSCH scheduled by using the DCI, for example, determine, based on a slot in which the PDCCH is located plus an offset K0 indicated by the DCI, a slot in which the PDSCH is located, and determine, based on an SLIV indicated by the DCI, a time domain resource location or a time domain location occupied by the PDSCH in a transmission slot of the PDSCH, that is, the first time domain resource.

For example, as shown in FIG. 8, before the terminal device determines the first downlink data occasion set based on the first time domain resource set, that is, before S601, the method further includes the following steps:

S803: The network device sends DCI to the terminal device.

S804: The terminal device receives the DCI sent by the network device.

Because the first time domain resource belongs to the first time domain resource set, and each downlink data occasion in the first downlink data occasion set corresponds to at least one of the N time domain resources, the terminal device may determine a downlink data occasion corresponding to the first time domain resource as the first downlink data occasion.

For example, the first downlink data occasion belongs to the first downlink data occasion set, and meets the following: the first time domain resource belongs to at least one time domain resource corresponding to the first downlink data occasion. For example, if the first time domain resource is a time domain resource indicated by SLIV #12, the first time domain resource is one of seven time domain resources indicated by the SLIVs {#0, #1, #2, #3, #4, #6, #12} included in the first PDSCH occasion.

In some other embodiments, the first time domain resource is a start time domain resource for repeatedly transmitting first downlink data K times in a slot. The first time domain resource is any one of the N time domain resources included in the first time domain resource set. The first downlink data occasion is any one of the M downlink data occasions included in the first downlink data occasion set, K is an integer, and K≥2.

In some other embodiments, the network device may indicate a quantity K of repetitions by using a higher layer parameter or DCI. The network device sends downlink data on K time domain resources.

The terminal device may determine a second time domain resource set based on the quantity K of repetitions and the first time domain resource, receive the downlink data on the K time domain resources, and perform receiving, demodulation, decoding, and check (for example, cyclic redundancy check (CRC)) on the received downlink data, to generate corresponding feedback information. The second time domain resource set includes K time domain resources. In this specification, the K time domain resources are time domain resources for repeatedly transmitting the first downlink data K times. For ease of description, the time domain resources for repeatedly transmitting the first downlink data K times may be referred to as the K time domain resources for short. The first time domain resource belongs to the second time domain resource set.

In some other embodiments, at least one of the time domain resources for repeatedly transmitting the first downlink data K times does not belong to the first time domain resource set. For example, the second time domain resource set includes a second time domain resource, and the second time domain resource does not belong to the first time domain resource set. For example, as shown in FIG. 3, the second time domain resource set includes a time domain resource indicated by SLIV #12 and a time domain resource for repeatedly sending downlink data for the second time. The first time domain resource is the time domain resource indicated by SLIV #12. The second time domain resource is the time domain resource for repeatedly sending downlink data for the second time, that is, a time domain resource marked in black in the figure, and does not belong to the first time domain resource set. In this case, if the terminal device determines the first downlink data occasion based on the at least one time domain resource, the first downlink data occasion definitely does not belong to the first downlink data occasion set. Therefore, it cannot be ensured that feedback information of the first downlink data has a corresponding feedback location.

In some embodiments, because the start time domain resource (the first time domain resource) for sending the first downlink data belongs to the time domain resource set (that is, the first time domain resource set) indicated by the preset TDRA table, the first downlink data occasion determined based on the first time domain resource belongs to the first downlink data occasion set. In this way, it can be ensured that feedback information of the first downlink data has a corresponding feedback location.

In some other embodiments, the terminal device does not determine the first downlink data occasion set based on the second time domain resource set. Optionally, the terminal device does not determine the first downlink data occasion set based on the second time domain resource (that is, a time domain resource that is for repeatedly transmitting the first downlink data K times in time domain and that does not belong to the first time domain resource set).

In some other embodiments, the terminal device does not determine the first downlink data occasion set based on a time domain resource (for example, the second time domain resource) other than the first time domain resource in the second time domain resource set.

In some other embodiments, time domain resources for repeatedly transmitting the first downlink data K times belong to one slot, or at least two of time domain resources for repeatedly transmitting the first downlink data K times belong to one slot.

In some other embodiments, lengths of time domain resources for repeatedly transmitting the first downlink data K times are the same.

In some other embodiments, a distance between a start symbol of an $i^{th}$ time domain resource and a start symbol of the first time domain resource in time domain resources for repeatedly transmitting the first downlink data K times is $(i-1)*T$. T is a length of the first time domain resource, or T is a sum of a length of the first time domain resource and a first gap. The first gap is preset, that is, predefined or configured by a higher layer parameter, and i=2, 3, . . . , and K.

In some other embodiments, transmission configuration indicators (TCIs) corresponding to at least two of time domain resources for repeatedly transmitting the first downlink data K times have different values.

In some other embodiments, there are two time domain resources in time domain resources for repeatedly transmitting the first downlink data K times, and downlink data transmissions on the two time domain resources are from different sending nodes.

In another example embodiment, the quantity K of repetition transmissions is semi-persistently indicated by a higher layer parameter, and this is compatible with slot-based repeated transmission. Alternatively, the quantity K of repeated transmissions is dynamically indicated by DCI, and the DCI is further used to schedule the first downlink data. In this way, different quantities of repetitions may be dynamically selected based on a data scheduling latency, a reliability requirement, and a location of the first time domain resource.

In another example embodiment, the quantity K of repetitions is semi-persistently indicated by a higher layer parameter, and values of quantities K of repetitions associated with different time domain resources in the first time domain resource set may be different. For example, each time domain resource in the first time domain resource set may be associated with one specific quantity K of repetitions. In this way, an increase in DCI overheads caused by dynamically indicating a quantity of repetitions in the DCI is avoided, and different quantities of repetitions may be configured based on different time domain resource locations, so as to achieve a best compromise between overheads and flexibility.

In another example embodiment, TCIs corresponding to at least two of time domain resources for repeatedly transmitting the first downlink data K times have different values. In this case, different transmissions of the first downlink data may be sent by different stations, so that a spatial diversity gain can be obtained, and a probability of successful data transmission can be improved.

S603: Generate a first codebook based on first feedback information, the first downlink data occasion, and the first downlink data occasion set.

The first feedback information is indication information indicating whether a decoding result of the first downlink data is correct. For example, if decoding is correct, the first feedback information is an ACK; or if decoding is incorrect, the first feedback information is a NACK.

In some embodiments, the terminal device may generate a first feedback sequence based on the first downlink data occasion set. Each feedback location in the first feedback sequence has a correspondence with a downlink data occasion in the first downlink data occasion set. It should be understood that the downlink data occasion included in the first downlink data occasion set is a downlink data occasion in one slot. Therefore, the feedback location included in the first feedback sequence is an ACK/NACK feedback location corresponding to a PDSCH occasion in one slot. One PDSCH occasion in one slot corresponds to one ACK/NACK feedback location. For example, the first downlink data occasion set includes four downlink data occasions, and the first feedback sequence includes four feedback locations.

After receiving the first downlink data on the first time domain resource, and determining the first downlink data occasion based on the first time domain resource, the terminal device may add the first feedback information to a feedback location corresponding to the first downlink data occasion, to generate the first codebook. In this case, the first codebook includes one bit, that is, the information indicating whether the decoding result of the first downlink data is correct. For example, if the bit is 1, it indicates an ACK, or if the bit is 0, it indicates a NACK. Optionally, another feedback location may carry feedback information of another downlink data transmission, or the terminal device does not receive corresponding downlink data transmission on any time domain resource in a time domain resource set included in a downlink data occasion corresponding to a feedback location. The feedback location may not carry feedback information of any downlink data, and may be set to 0.

In some other embodiments, the network device may further configure a first offset set by using a higher layer parameter. The terminal device may obtain the first offset set based on the higher layer configuration. The first offset set includes S offsets K1, S is an integer, and S≥1. The offset K1 is a difference between a number of a slot in which downlink data transmission is performed and a number of a slot in which corresponding ACK/NACK feedback is performed. Alternatively, the offset K1 may be described as follows: The offset K1 is equal to a value obtained by subtracting a number of a slot in which downlink data transmission is performed from a number of an ACK/NACK feedback slot. For example, if the number of the slot in which downlink data transmission is performed is n, and the number of the slot in which corresponding ACK/NACK feedback is performed is n+2, the offset K1 is 2 (n+2−n=2).

The terminal device may traverse values of K1 that are predefined or configured by a higher layer, to determine a slot set for sending a PDSCH. Assuming that there are S values of K1, the terminal device may determine, based on the S values of K1 and an uplink slot (for example, n+2) in which ACK/NACK feedback is performed, a slot set for sending a PDSCH. The slot set for sending a PDSCH includes S slots.

PDSCH occasions in S potential PDSCH slots corresponding to the S values of K1 are sequentially connected in series, to form a final PDSCH occasion sequence (or referred to as a feedback sequence). Each PDSCH occasion corresponds to one ACK/NACK feedback location, and the ACK/NACK feedback location is a common AN bit of one or more SLIVs corresponding to the PDSCH occasion. Therefore, the first codebook may further include feedback information at the ACK/NACK feedback locations in the S slots. The feedback information at the ACK/NACK feedback location in each slot may be fed back according to the method in embodiments.

S604: The terminal device determines a first feedback slot based on a first offset.

In some embodiments, the first offset is a difference between a number of a slot for transmitting the first downlink data and a number of a slot for feeding back the first codebook. It should be understood that the first offset (the value of K1) is equal to a value obtained by subtracting a number of a slot in which downlink data transmission is performed from a number of an ACK/NACK feedback slot. For example, if the number of the slot in which downlink data transmission is performed is n, and the first offset is 2, the corresponding number of the slot in which ACK/NACK feedback is performed is n+2.

In some other embodiments, the first offset may be indicated by DCI. The first offset belongs to the first offset set. Optionally, the DCI may further indicate a first feedback resource, and the first feedback resource is used to carry the first codebook, for example, a first PUCCH resource.

Figure 9:
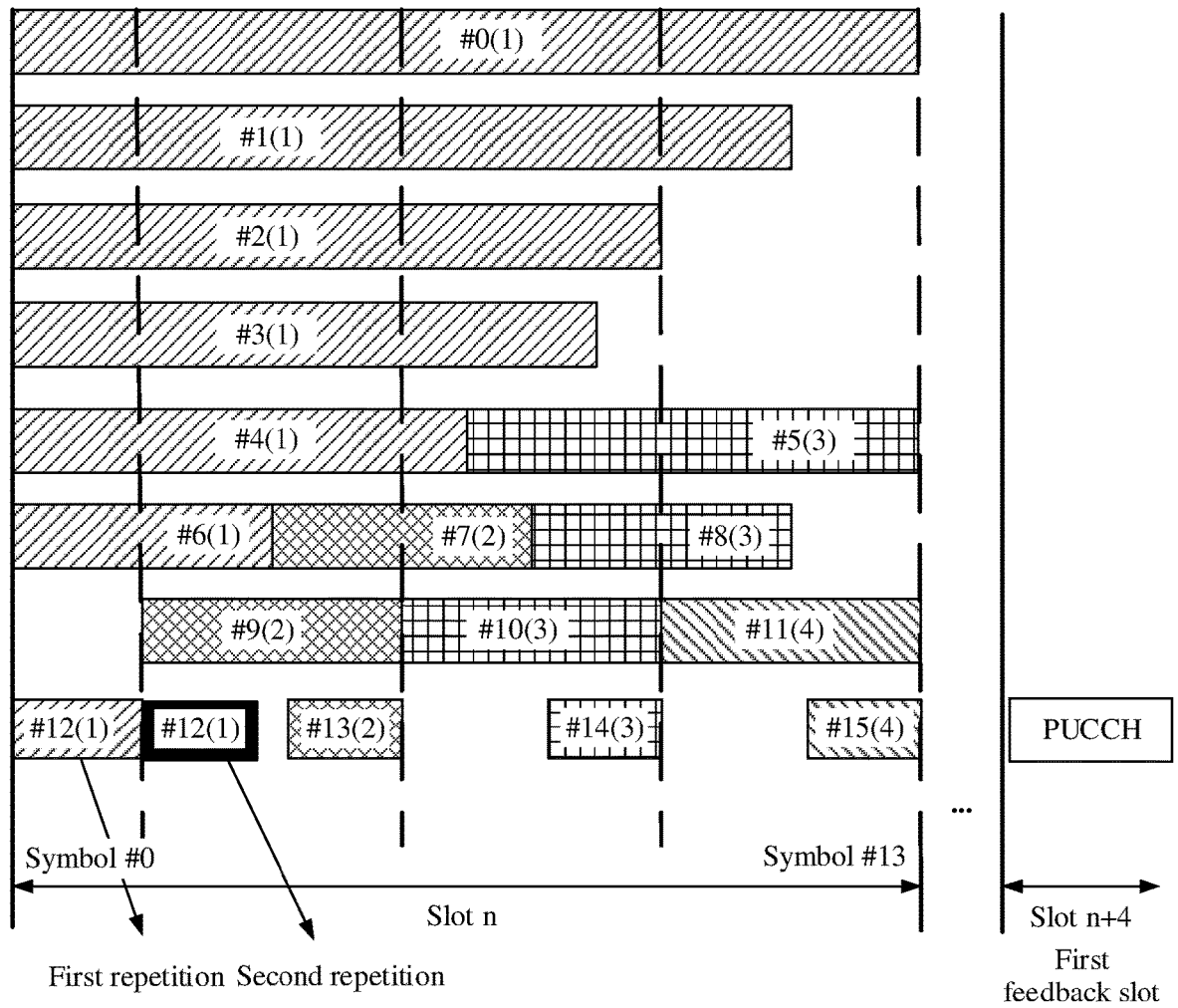
FIG. 9 is a schematic diagram of a feedback slot according to an embodiment.

In some embodiments, time domain resources for repeatedly transmitting the first downlink data K times belong to one slot, and the terminal device may determine the first feedback slot based on a slot in which the first time domain resource is located and the first offset. For example, as shown in FIG. 9, time domain resources indicated by SLIV #12 are used to repeatedly send downlink data twice, and the time domain resources indicated by SLIV #12 and used to repeatedly send downlink data twice are both in a slot n. It is assumed that the first offset is 4, and the first feedback slot is a slot n+4.

In some other embodiments, when time domain resources for repeatedly transmitting the first downlink data K times belong to a plurality of slots (in this case, at least two of the K time domain resources belong to one slot), the terminal device may determine the first feedback slot based on a slot in which a last time domain resource in the second time domain resource set is located and the first offset.

S605: The terminal device sends the first codebook in the first feedback slot.

In some embodiments, the terminal device sends the first codebook on a first feedback resource (for example, a PUCCH resource) in the first feedback slot.

S606: The network device determines a first downlink data occasion set based on a first time domain resource set.

The first time domain resource set includes N time domain resources, the first downlink data occasion set includes M downlink data occasions, both N and M are integers, N≥1, M≥1, and M≤N. For specific explanations of determining the first downlink data occasion set based on the first time domain resource set, refer to descriptions of S601. Details are not described again.

S607: The network device determines a first downlink data occasion based on a first time domain resource.

The first time domain resource is a start time domain resource for repeatedly transmitting first downlink data K times in a slot. It should be understood that the first time domain resource is any one of the N time domain resources included in the first time domain resource set. The first downlink data occasion is any one of the M downlink data occasions included in the first downlink data occasion set. For specific explanations of determining the first downlink data occasion based on the first time domain resource, refer to descriptions of S602. Details are not described again.

S608: The network device determines a first feedback slot based on a first offset.

The first offset is a difference between a number of a slot for transmitting the first downlink data and a number of a slot for feeding back a first codebook, the first codebook is determined based on first feedback information, the first downlink data occasion, and the first downlink data occasion set, and the first feedback information indicates whether a decoding result of the first downlink data is correct.

For detailed explanations of S606 to S608, refer to detailed explanations of S601, S602, and S604. Details are not described again.

It should be noted that a sequence of the steps in the method for sending hybrid automatic repeat request acknowledgement/negative acknowledgement information provided in embodiments of this application may be appropriately adjusted, and the steps may also be correspondingly added or reduced according to a situation. For example, a sequence of S606 to S608 and S601 to S605 may be exchanged. To be specific, the network device may perform steps S606 to S608 before the terminal device performs steps S601 to S605. Any method that can be readily determined by a person skilled in the art within the technical scope disclosed in this application shall fall within the protection scope of this application. Therefore, details are not described again.

S609: The network device receives the first codebook in the first feedback slot based on the first downlink data occasion set and the first downlink data occasion.

In some embodiments, the network device receives the first codebook on a first feedback resource in the first feedback slot based on a size of the first downlink data occasion set. Optionally, the network device determines a location of feedback information of the first downlink data in the codebook based on the first downlink data occasion, that is, a first feedback location, and receives first feedback information of the first downlink data at the first feedback location in the first codebook.

In another example embodiment, the network device may further indicate that a feedback mode of the first downlink data is semi-persistent codebook feedback.

In another example embodiment, the terminal device may determine that a feedback mode of the first downlink data is semi-persistent codebook feedback.

Therefore, the semi-persistent codebook feedback can ensure that a feedback codebook size is not affected by whether the network device actually sends data, so as to avoid an incorrect codebook size determined by the terminal device due to no detection of some DCI for scheduling data.

According to the method for sending or receiving hybrid automatic repeat request acknowledgement/negative acknowledgement information provided in embodiments of this application, a start time domain resource for sending downlink data belongs to a time domain resource set (that is, the first time domain resource set) indicated by a preset TDRA. Therefore, the first downlink data occasion belongs to the first downlink data occasion set. In this way, it can be ensured that feedback information of the first downlink data has a corresponding feedback location. For downlink data repeatedly transmitted in a slot, information indicating whether a decoding result is correct can be successfully fed back. Therefore, for downlink data repeatedly transmitted in a slot, this application proposes a new method for determining a downlink data occasion and a new method for determining a feedback information location, so that codebook feedback can be performed semi-persistently in a new scenario.

Figure 10:
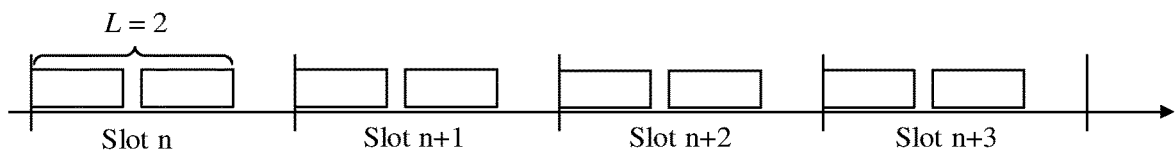
FIG. 10 is a schematic diagram of time domain resource sending according to an embodiment.

Currently, an M-TRP technology is introduced in downlink transmission to obtain a link diversity gain and improve data transmission reliability. In some embodiments, to improve reliability of downlink data transmission, downlink data may be jointly transmitted based on intra-slot based repetition (intra-slot based PDSCH repetition) and slot-based repetition (Slot-based PDSCH repetition). For example, as shown in FIG. 10, the network device indicates that a PDSCH is to be separately sent from two TRPs on two time domain resources in one slot. In addition, a higher layer parameter indicates that PDSCH transmission is repeatedly sent in four slots.

In an uplink, sub-slot-based feedback (sub-slot-based HARQ-ACK feedback) is introduced to allow feeding back ACKs/NACKs of a plurality of pieces of downlink data on time division multiplexing (TDM) PUCCH resources in one slot, thereby reducing a feedback latency.

Figure 11:
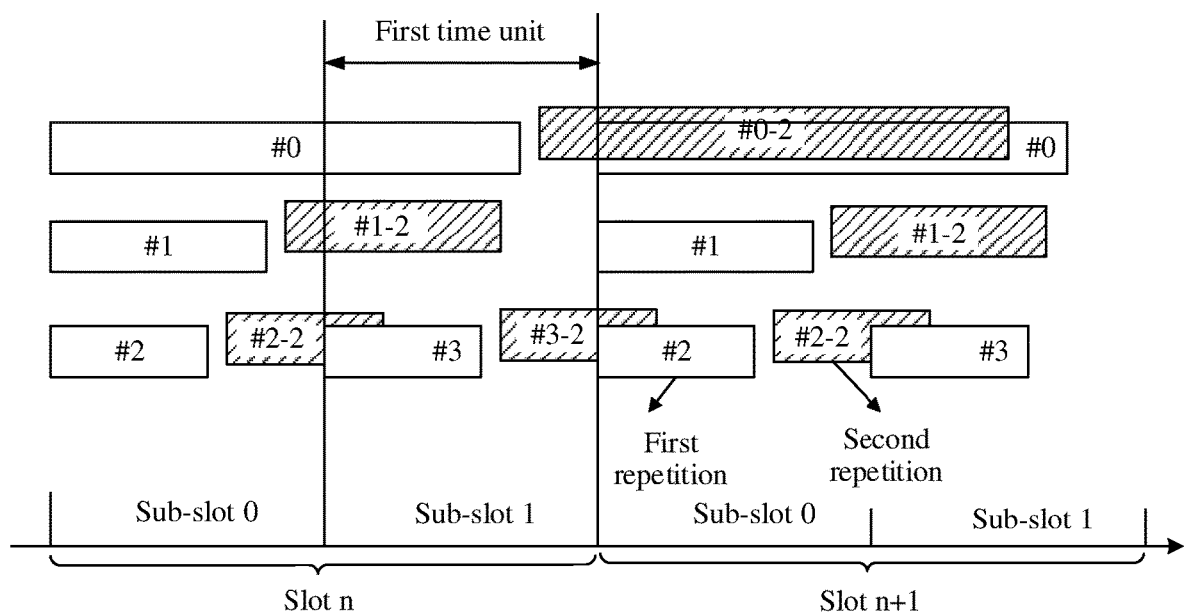
FIG. 11 is a schematic diagram of time domain resource sending according to an embodiment.

However, a time domain location at which repeated transmission is performed may not be on a resource specified in the TDRA table configured by the higher layer. Consequently, the HARQ-ACK codebook cannot be fed back. For example, as shown in FIG. 11, a slot n includes four SLIVs, that is, SLIV #0 to SLIV #3. A time domain resource indicated by SLIV #0 is used to repeatedly send downlink data twice, and a time domain resource indicated by SLIV #0-2 and used to repeatedly send downlink data for the second time is not the resource specified in the TDRA table. A time domain resource indicated by SLIV #3 is used to repeatedly send downlink data twice, and a time domain resource indicated by SLIV #3-2 and used to repeatedly send downlink data for the second time is not the resource specified in the TDRA table. In this way, generation of the semi-persistent codebook needs to be adaptively changed. However, a current protocol does not specify a mechanism for performing feedback on downlink data repeatedly transmitted in a slot.

Figure 12:
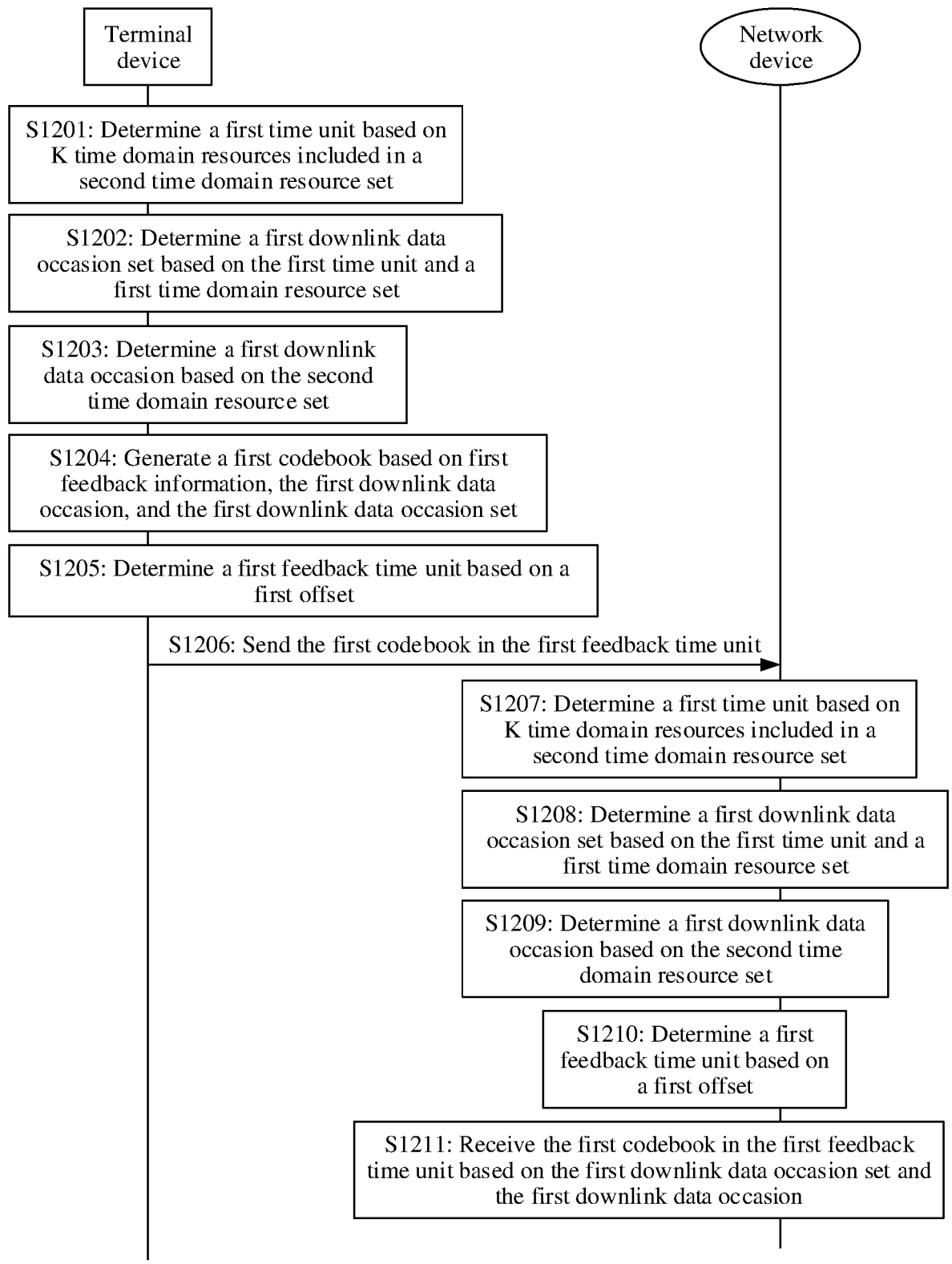
FIG. 12 is a flowchart of a method for sending hybrid automatic repeat request acknowledgement/negative acknowledgement information according to an embodiment.

The following describes in detail a method for sending hybrid automatic repeat request acknowledgement/negative acknowledgement information. FIG. 12 is a flowchart of a method for sending hybrid automatic repeat request acknowledgement/negative acknowledgement information according to an embodiment of this application. It is assumed herein that a first time unit is a sub-slot, and a second time unit is a slot. Time domain resources required for repeatedly transmitting data based on a slot are in one slot. ACK/NACK feedback is performed based on a sub-slot. As shown in FIG. 12, the method may include the following steps.

S1201: A terminal device determines a first time unit based on K time domain resources included in a second time domain resource set.

The K time domain resources included in the second time domain resource set are indicated time domain resources for repeatedly transmitting first downlink data K times in a second time unit. The second time unit includes the first time unit.

In some embodiments, the terminal device may determine, through PDCCH blind detection, that there is a PDCCH sent to the terminal device in a time unit, obtain, by parsing DCI carried by the PDCCH, information about a PDSCH scheduled by using the DCI, for example, determine, based on a time unit in which the PDCCH is located plus an offset K0 indicated by the DCI, a time unit in which the PDSCH is located, and determine, based on an SLIV indicated by the DCI, a time domain resource location or a time domain location occupied by the PDSCH in a transmission time unit of the PDSCH, that is, the first time domain resource. Then, the terminal device determines the second time domain resource set based on a quantity K of repetitions and a first time domain resource. For other related explanations, refer to descriptions in the foregoing embodiments. Details are not described herein again.

In an example embodiment, the first time unit is a sub-slot, and the second time unit is a slot. In this way, it can be ensured that downlink data is repeatedly transmitted in a slot, thereby shortening a transmission latency. In addition, feedback information of the downlink data is transmitted in a sub-slot, and feedback information of a plurality of pieces of downlink data may be separately fed back in different sub-slots in one slot, thereby shortening a feedback latency.

In another example embodiment, the quantity K of repetitions is semi-persistently indicated by a higher layer parameter. This is compatible with slot-based repeated transmission.

In another example embodiment, the quantity K of repetitions is semi-persistently indicated by a higher layer parameter, and values of quantities K of repetitions associated with different time domain resources in the first time domain resource set may be different. For example, each time domain resource in the first time domain resource set may be associated with one specific quantity K of repetitions. In this way, an increase in DCI overheads caused by dynamically indicating a quantity of repetitions in the DCI is avoided, and different quantities of repetitions may be configured based on different time domain resource locations, so as to achieve a best compromise between overheads and flexibility.

The first time unit is a time unit in which an end symbol of a target time domain resource in the second time domain resource set is located.

In some embodiments, the target time domain resource may be a $K^{th}$ time domain resource in the second time domain resource set, that is, a last time domain resource in the second time domain resource set. The terminal device may determine, as the first time unit, the time unit in which the end symbol of the $K^{th}$ time domain resource in the second time domain resource set is located. It should be understood that the terminal device may determine, as the first time unit, the time unit in which the end symbol of the last time domain resource in the second time domain resource set is located. In this way, the terminal device determines a feedback time based on the last time domain resource, so that it can be ensured that the terminal device has sufficient time to receive and decode downlink data, or perform combined decoding based on receiving results of a plurality of repeated transmissions.

For example, as shown in FIG. 11, it is assumed that a TDRA table indicates four SLIVs, that is, SLIV #0 to SLIV #3. A slot n includes SLIV #0 to SLIV #3. Assuming that SLIV #2 is the first time domain resource indicated by the DCI, and the quantity of repetitions is 2, SLIV #2-2 is a new SLIV that appears based on intra-slot repetition (intra-slot PDSCH repetition). Therefore, the second time domain resource set includes SLIV #2 and SLIV #2-2. Because an end symbol of SLIV #2-2 is in a sub-slot 1, the first time unit may be the sub-slot 1. Assuming that SLIV #3 is the first time domain resource indicated by the DCI, and the quantity of repetitions is 2, SLIV #3-2 is a new SLIV that appears based on intra-slot repetition (intra-slot PDSCH repetition). Therefore, the second time domain resource set includes SLIV #3 and SLIV #3-2. Because an end symbol of SLIV #3-2 is in a sub-slot 0, the first time unit may be the sub-slot 0 in a next slot (Sub-slot 1).

In some other embodiments, the target time domain resource may be a last time domain resource in time domain resources that are in the second time domain resource set and that are obtained after a conflict with an uplink symbol is removed, and a location of the uplink symbol is semi-persistently indicated by a higher layer parameter. The terminal device may determine a time unit in which an end symbol of a target time domain resource in the second time domain resource set is located as the first time unit. The target time domain resource is a last time domain resource in time domain resources that are in the second time domain resource set and that are obtained after a conflict with an uplink symbol is removed, and a location of the uplink symbol is semi-persistently indicated by a higher layer parameter. In this way, if a time domain resource used for last transmission conflicts with the uplink symbol, both the terminal device and the network device know that the transmission is not sent, and the terminal device may determine a feedback time unit based on a time domain resource used for penultimate repeated transmission. This can ensure fast feedback of feedback information. In addition, if a time resource used for last transmission conflicts with the uplink symbol, a feedback time unit is still determined based on the time domain resource used for last transmission. The time domain resource used for the transmission is considered as an invalid time domain resource and is not involved in determining a downlink data occasion, the feedback time unit determined based on the transmission is used to perform feedback on downlink data transmission in a time unit in which the transmission is performed. Consequently, it cannot be ensured that feedback information of the first downlink data has a corresponding feedback location.

S1202: The terminal device determines a first downlink data occasion set based on the first time unit and a first time domain resource set.

In some embodiments, the terminal device may first determine the first time domain resource set based on the TDRA table. Generally, the TDRA table indicates N SLIVs, N is an integer, and N≥1. It should be understood that the SLIV is a time domain resource used by the terminal device to send a PDSCH in a slot. Therefore, the first time domain resource set includes N time domain resources, and the time domain resource is a time domain location at which the terminal device sends a PDSCH in one time unit. Then, the terminal device determines a third time domain resource set based on the first time domain resource set and the quantity K of repetitions, that is, the third time domain resource set includes N time domain resources and a repeated resource of each time domain resource, then determines a fourth time domain resource set based on the third time domain resource set and the first time unit, that is, the fourth time domain resource set includes a time domain resource that is in the third time domain resource set and whose end symbol is located in the first time unit, and finally determines the first downlink data occasion set based on the fourth time domain resource set. For example, the terminal device may segment, based on a start symbol or an end symbol of the time domain resource, the time domain resources included in the fourth time domain resource set, to obtain potential PDSCH occasions in a slot for sending a PDSCH. Each PDSCH occasion obtained after the segmentation corresponds to a plurality of overlapping valid SLIVs, but only one of these overlapping valid SLIVs can be transmitted at most, and therefore corresponds to one ACK/NACK feedback.

In this way, it is ensured that the third time domain resource set includes a new time domain resource that is caused by repeated transmission and that does not belong to the first time domain resource, so that it can be ensured that feedback information of the first downlink data has a feedback location. In addition, the fourth time domain resource set may include only a time domain resource whose end symbol belongs to the first time unit, so that feedback overheads are minimized.

For example, as shown in FIG. 11, a slot n includes SLIV #0 to SLIV #3. It may be understood that the first time domain resource set includes SLIV #0 to SLIV #3. Assuming that the quantity of repetitions is 2, each SLIV in SLIV #0 to SLIV #3 is used to repeatedly send downlink data twice, to obtain the third time domain resource set.

In some embodiments, time domain resources required for repeatedly transmitting data based on a slot are limited to be in one slot. Because end symbols of SLIV #0-2 and SLIV #3-2 are not in the slot n, the third time domain resource set does not include SLIV #0-2 and SLIV #3-2. The third time domain resource set includes {#0, #1, #1-2, #2, #2-2, #3}. Assuming that the first time unit is a sub-slot 1, the fourth time domain resource set is obtained based on the end symbol. The fourth time domain resource set includes {#0, #1-2, #2-2, #3}.

In some other embodiments, time domain resources required for repeatedly transmitting data based on a slot are not limited to be in one slot. The third time domain resource set includes {#0, #0-2, #1, #1-2, #2, #2-2, #3, #3-2}. Assuming that the first time unit is a sub-slot 1, the fourth time domain resource set is obtained based on the end symbol. The fourth time domain resource set includes {#0, #0-2, #1-2, #2-2, #3}. It should be noted that, although SLIV #0-2 exceeds the slot n, an end symbol of SLIV #0-2 is in a sub-slot 1 of a slot n+1. In this case, it may be considered that SLIV #0-2 is also a time domain resource in the fourth time domain resource set.

Optionally, the terminal device may segment, based on a start symbol or an end symbol of the time domain resource, the time domain resources included in the fourth time domain resource set, to obtain potential PDSCH occasions in a slot for sending a PDSCH. For a specific segmentation method, refer to the conventional technology. Details are not described again.

In this way, a downlink data occasion may be determined based on the target time domain resource, to determine a feedback location. A feedback location of another repeated time domain resource is filled with a NACK, and side information may be provided to assist decoding. Alternatively, one or more downlink data occasions may be determined based on one or more time domain resources belonging to the first time unit, to determine a plurality of feedback locations for redundant transmission, thereby improving feedback information transmission reliability.

S1203: The terminal device determines a first downlink data occasion based on the second time domain resource set.

The terminal device may determine the second time domain resource set based on the quantity K of repetitions and the first time domain resource, receive the downlink data on the K time domain resources, and perform receiving, demodulation, decoding, and check (for example, CRC) on the received downlink data, to generate corresponding feedback information. The second time domain resource set includes K time domain resources. In this specification, the K time domain resources are time domain resources for repeatedly transmitting the first downlink data K times. For ease of description, the time domain resources for repeatedly transmitting the first downlink data K times may be referred to as the K time domain resources for short.

The first downlink data occasion is any one of the M downlink data occasions included in the first downlink data occasion set.

In some embodiments, the terminal device may determine the first downlink data occasion based on the target time domain resource in the second time domain resource set. For example, the target time domain resource may be a $K^{th}$ time domain resource in the second time domain resource set, that is, a last time domain resource in the second time domain resource set. For example, as shown in FIG. 11, the first transmission is performed by using SLIV #2, that is, the first time domain resource is SLIV #2, the second time domain resource set includes SLIV #2 and SLIV #2-2, and the target time domain resource is a last time domain resource in the second time domain resource set, this is, SLIV #2-2.

For another example, the target time domain resource may be a last time domain resource in time domain resources that are in the second time domain resource set and that are obtained after a conflict with an uplink symbol is removed, and a location of the uplink symbol is semi-persistently indicated by a higher layer parameter.

In some other embodiments, the terminal device determines a fifth time domain resource set, where any time domain resource in the fifth time domain resource set belongs to the second time domain resource set, and an end symbol is located in the first time unit, and determines one or more first downlink data occasions based on one or more time domain resources in the fifth time domain resource set.

S1204: Generate a first codebook based on first feedback information, the first downlink data occasion, and the first downlink data occasion set.

In some embodiments, the terminal device may generate a first feedback sequence based on the first downlink data occasion set. Each feedback location in the first feedback sequence has a correspondence with a downlink data occasion in the first downlink data occasion set. The terminal device adds the first feedback information to a feedback location corresponding to the first downlink data occasion, to generate the first codebook. The first feedback information corresponding to the first downlink data is indication information indicating whether a decoding result of the first downlink data is correct. For example, if decoding is correct, the first feedback information is an ACK; or if decoding is incorrect, the first feedback information is a NACK. For details, refer to explanations of S603. Details are not described again.

S1205: The terminal device determines a first feedback time unit based on a first offset.

In some embodiments, the first feedback time unit is determined based on the first offset and a number of the first time unit. The first offset is a difference between the number of the first time unit and a number of a time unit for feeding back the first codebook. Therefore, the terminal device has sufficient time to receive repeatedly transmitted downlink data. For details, refer to explanations of S604. Details are not described again.

S1206: The terminal device sends the first codebook in the first feedback time unit.

In some embodiments, the terminal device sends the first codebook on a first feedback resource (for example, a PUCCH resource) in the first feedback time unit. For details, refer to explanations of S605. Details are not described again.

S1207: A network device determines a first time unit based on K time domain resources included in a second time domain resource set.

The K time domain resources are indicated time domain resources for repeatedly transmitting first downlink data K times in a second time unit, the second time unit includes the first time unit, K is an integer, and K≥2. For details, refer to explanations of S1201. Details are not described again.

S1208: The network device determines a first downlink data occasion set based on the first time unit and a first time domain resource set.

The first time domain resource set includes N time domain resources, a first time domain resource is any one of the N time domain resources, and the first time domain resource is a start time domain resource for repeatedly transmitting first downlink data K times in a second time unit. The first downlink data occasion set includes M downlink data occasions, both N and M are integers, N≥1, M≥1, and M≤N.

S1209: The network device determines a first downlink data occasion based on the second time domain resource set.

S1210: The network device determines a first feedback time unit based on a first offset.

For detailed explanations of S1207 to S1210, refer to detailed explanations of S1201, S1202, S1203, and S1205. Details are not described again.

S1211: The network device receives the first codebook in the first feedback time unit based on the first downlink data occasion set and the first downlink data occasion.

In some embodiments, the network device receives the first codebook on a first feedback resource in the first feedback time unit based on a size of the first downlink data occasion set. Optionally, the network device determines a location of feedback information of the first downlink data in the codebook based on the first downlink data occasion, that is, a first feedback location, and receives first feedback information of the first downlink data at the first feedback location in the first codebook.

In an example embodiment, the terminal device determines that a feedback mode of the first downlink data is semi-persistent codebook feedback. The semi-persistent codebook feedback can ensure that a feedback codebook size is not affected by whether the network device actually sends data, so as to avoid an incorrect codebook size determined by the terminal device due to no detection of some DCI for scheduling data.

In another example embodiment, the network device indicates that a feedback mode of the first downlink data is semi-persistent codebook feedback.

According to the method for sending or receiving hybrid automatic repeat request acknowledgement/negative acknowledgement information provided in embodiments of this application, for downlink data repeatedly transmitted in a slot, a semi-persistent codebook is fed back based on a sub-slot, and all repeated time domain resources in the first time domain resource set are segmented, to obtain a PDSCH occasion, thereby ensuring that a PDSCH repeatedly transmitted last time has a corresponding PDSCH occasion. In addition, a feedback location in a feedback sequence is determined based on a time domain resource repeatedly transmitted last time, so that information indicating whether a decoding result is correct can be successfully fed back. Therefore, for downlink data repeatedly transmitted in a slot and a semi-persistent codebook fed back based on a sub-slot, this application proposes a new method for determining a downlink data occasion and a new method for determining a feedback information location, so that codebook feedback can be performed semi-persistently in a new scenario.

Figure 13:
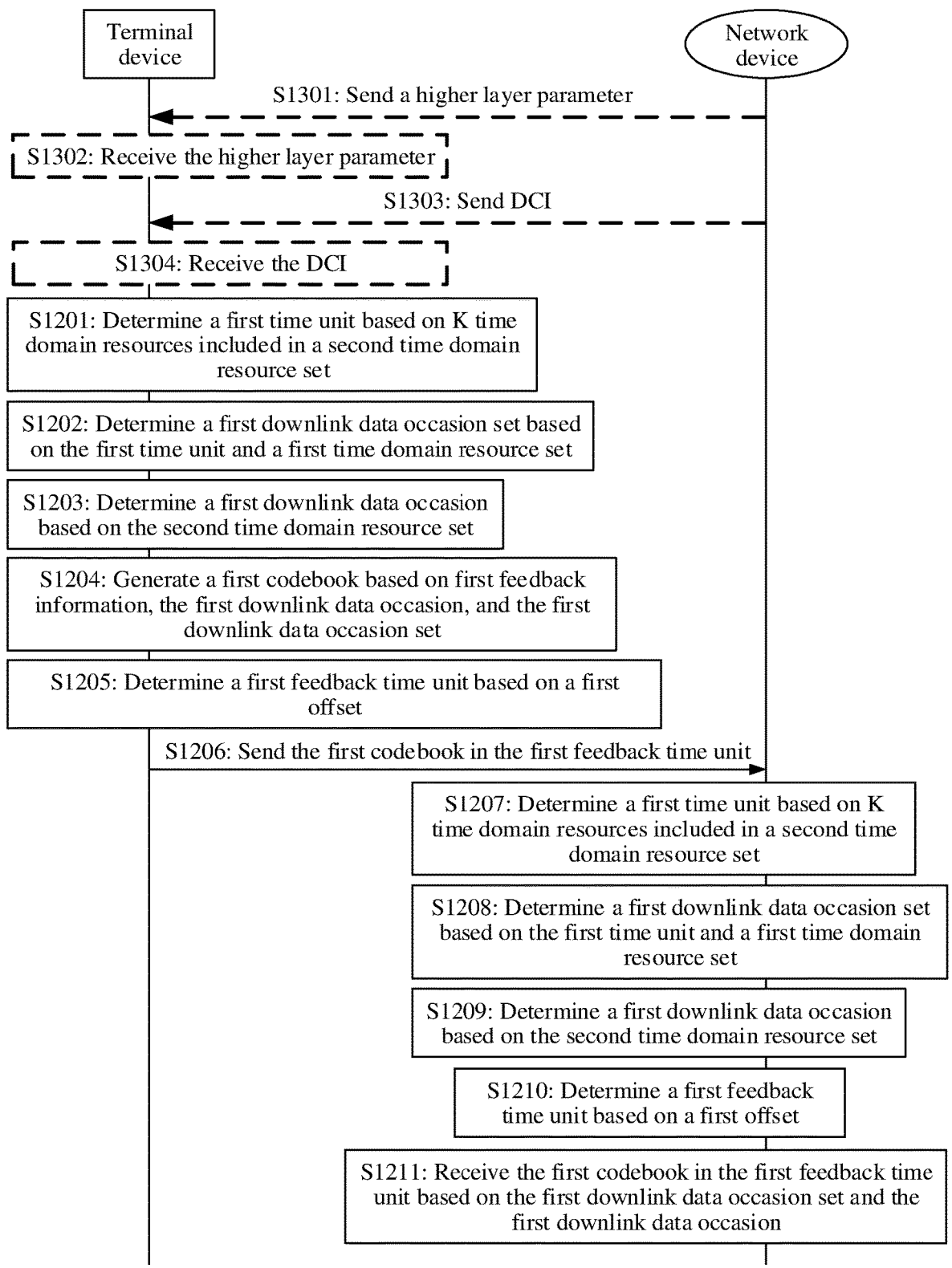
FIG. 13 is a flowchart of a method for sending hybrid automatic repeat request acknowledgement/negative acknowledgement information according to an embodiment.

In some embodiments, as shown in FIG. 13, before the terminal device determines the first time unit based on the K time domain resources included in the second time domain resource set, that is, before S1201, the method further includes the following steps:

S1301: The network device sends a higher layer parameter to the terminal device.

S1302: The terminal device receives the higher layer parameter sent by the network device.

S1303: The network device sends DCI to the terminal device.

S1304: The terminal device receives the DCI sent by the network device.

For detailed explanations of S1301 to S1304, refer to descriptions of the foregoing embodiments. Details are not described again.

It may be understood that, to implement functions in the foregoing embodiments, the network device and the terminal device include corresponding hardware structures and/or software modules for performing the functions. A person of ordinary skill in the art should understand that, in combination with the units and the method steps described in embodiments disclosed in this application, embodiments in this application can be implemented by hardware or a combination of hardware and computer software. Whether a function is performed by hardware or hardware driven by computer software depends on particular application scenarios and design constraints of the technical solutions.

Figure 14:
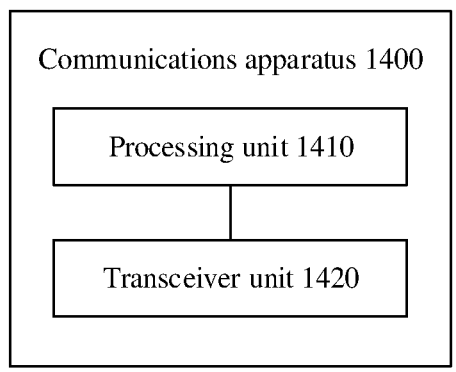
FIG. 14 is a schematic diagram of a structure of a communications apparatus according to an embodiment.
Figure 15:
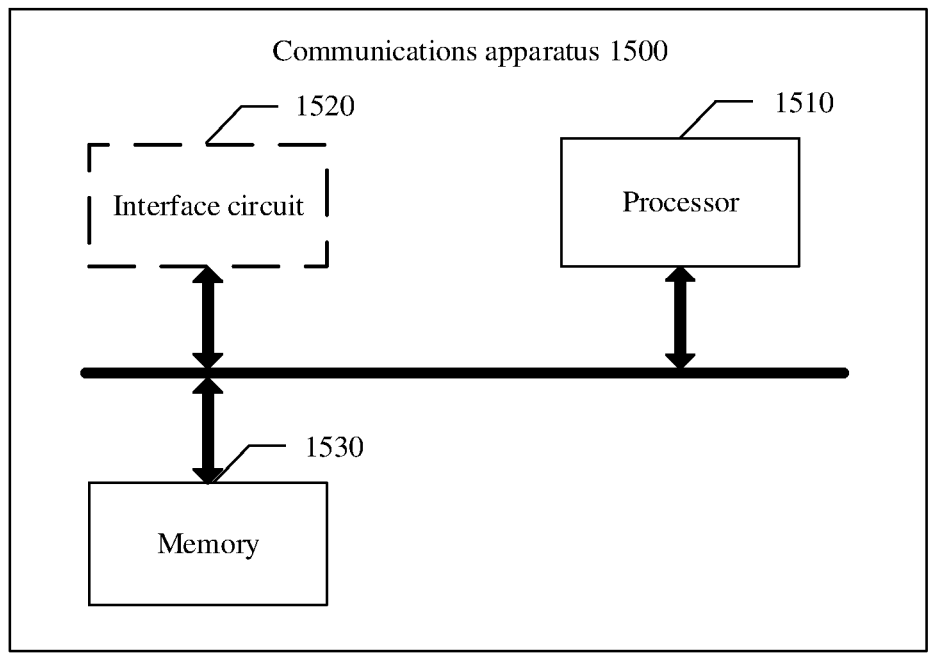
FIG. 15 is a schematic diagram of a structure of a communications apparatus according to an embodiment.

FIG. 14 and FIG. 15 are schematic diagrams of structures of possible communications apparatuses according to embodiments of this application. These communications apparatuses can be configured to implement functions of the terminal device or the network device in the foregoing method embodiments, and therefore can also implement beneficial effects of the foregoing method embodiments. In embodiments of this application, the communications apparatus may be the terminal device 403 or the terminal device 404 shown in FIG. 4, or may be the network device 402 shown in FIG. 4, or may be a module (for example, a chip) applied to the terminal device or the network device.

As shown in FIG. 14, the communications apparatus 1400 includes a processing unit 1410 and a transceiver unit 1420. The communications apparatus 1400 is configured to implement functions of the terminal device or the network device in the method embodiment shown in FIG. 6, FIG. 8, FIG. 12, or FIG. 13.

When the communications apparatus 1400 is configured to implement functions of the terminal device in the method embodiment shown in FIG. 6, the transceiver unit 1420 is configured to perform S605, and the processing unit 1410 is configured to perform S601 to S604.

When the communications apparatus 1400 is configured to implement functions of the network device in the method embodiment shown in FIG. 6, the transceiver unit 1420 is configured to perform S609, and the processing unit 1410 is configured to perform S606 to S608.

When the communications apparatus 1400 is configured to implement functions of the terminal device in the method embodiment shown in FIG. 8, the transceiver unit 1420 is configured to perform S605, S802, and S804, and the processing unit 1410 is configured to perform S601 to S604.

When the communications apparatus 1400 is configured to implement functions of the network device in the method embodiment shown in FIG. 8, the transceiver unit 1420 is configured to perform S609, S801, and S803, and the processing unit 1410 is configured to perform S606 to S608.

When the communications apparatus 1400 is configured to implement functions of the terminal device in the method embodiment shown in FIG. 12, the transceiver unit 1420 is configured to perform S1206, and the processing unit 1410 is configured to perform S1201 to S1205.

When the communications apparatus 1400 is configured to implement functions of the network device in the method embodiment shown in FIG. 12, the transceiver unit 1420 is configured to perform S1211, and the processing unit 1410 is configured to perform S1207 to S1210.

When the communications apparatus 1400 is configured to implement functions of the terminal device in the method embodiment shown in FIG. 13, the transceiver unit 1420 is configured to perform S1206, S1302, and S1304, and the processing unit 1410 is configured to perform S1201 to S1205.

When the communications apparatus 1400 is configured to implement functions of the network device in the method embodiment shown in FIG. 13, the transceiver unit 1420 is configured to perform S1211, S1301, and S1303, and the processing unit 1410 is configured to perform S1207 to S1210.

For more detailed descriptions of the processing unit 1410 and the transceiver unit 1420, directly refer to related descriptions of the method embodiments shown in FIG. 6, FIG. 8, FIG. 12, and FIG. 13. Details are not described herein again.

As shown in FIG. 15, the communications apparatus 1500 includes a processor 1510 and an interface circuit 1520. The processor 1510 and the interface circuit 1520 are coupled to each other. It may be understood that the interface circuit 1520 may be a transceiver or an input/output interface.

Optionally, the communications apparatus 1500 may further include a memory 1530, configured to store instructions executed by the processor 1510, or input data required by the processor 1510 to run the instructions, or data generated after the processor 1510 runs the instructions.

When the communications apparatus 1500 is configured to implement the method shown in FIG. 6, FIG. 8, FIG. 12, or FIG. 13, the processor 1510 is configured to implement the function of the processing unit 1410, and the interface circuit 1520 is configured to implement the function of the transceiver unit 1420.

When the communications apparatus is a chip applied to a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communications apparatus is a chip applied to a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

It should be noted that the processor in embodiments of this application may be a central processing unit (CPU), may be another general-purpose processor, a digital signal processor (DSP), an application-specific integrated circuit (ASIC), a field programmable gate array (FPGA), or another programmable logic device, a transistor logic device, a hardware component, or any combination thereof. The general-purpose processor may be a microprocessor or any conventional processor.

The method steps in embodiments of this application may be implemented in a hardware manner, or may be implemented in a manner of executing software instructions by the processor. The software instruction may include a corresponding software module. The software module may be stored in a random access memory (RAM), a flash memory, a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may further be a component of the processor. The processor and the storage medium may be located in an ASIC. In addition, the ASIC may be located in a network device or a terminal device. Certainly, the processor and the storage medium may exist in a network device or a terminal device as discrete components.

The foregoing descriptions about implementations allow a person skilled in the art to clearly understand that, for the purpose of convenient and brief description, division into only the foregoing function modules is used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, that is, may be located in one place, or may be distributed on a plurality of different places. Some or all of the units may be selected based on actual requirements to achieve the objectives of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

All or some of the foregoing embodiments may be implemented by using software, hardware, firmware, or any combination thereof. When software is used to implement embodiments, embodiments may be implemented all or partially in a form of a computer program product. The computer program product includes one or more computer programs or instructions. When the computer programs or instructions are loaded and executed on a computer, all or some of the procedures or functions in embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

In embodiments of this application, unless otherwise stated or there is a logic conflict, terms and/or descriptions between different embodiments are consistent and may be mutually referenced, and technical features in the different embodiments may be combined based on an internal logical relationship thereof, to form a new embodiment.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The symbol "/" in the text description of this application generally represents an "or" relationship between associated objects. In a formula of this application, the symbol "/" indicates a "division" relationship between associated objects.

It may be understood that various numbers in embodiments of this application are merely used for ease of distinguishing, and are not used to limit the scope of embodiments of this application. The sequence numbers of the foregoing processes do not mean an execution sequence, and the execution sequence of the processes should be determined according to functions and internal logic of the processes.

The foregoing descriptions are merely non-limiting examples of specific implementations, and are not intended to limit the protection scope, which is intended to cover any variation or replacement within the technical scope disclosed in this application. Therefore, the claims shall define the protection scope.

What is claimed is:

1. A method for sending hybrid automatic repeat request acknowledgement/negative acknowledgement information, comprising:
   determining a first downlink data occasion set based on a first time domain resource set, wherein the first time domain resource set comprises N time domain resources, the first downlink data occasion set comprises M downlink data occasions, both N and M are integers, $N \geq 1$, $M \geq 1$, and $M \leq N$;
   determining a first downlink data occasion based on a first time domain resource, wherein the first time domain resource is a start time domain resource for repeatedly transmitting first downlink data K times in a time unit, the first time domain resource is any one of the N time domain resources, the first downlink data occasion is any one of the M downlink data occasions, K is an integer, and $K \geq 2$;
   generating a first codebook based on first feedback information, the first downlink data occasion, and the first downlink data occasion set, wherein the first feedback information indicates whether a decoding result of the first downlink data is correct;
   determining a first feedback time unit based on a first offset, wherein the first offset is a difference between a sequence number of a time unit for transmitting the first downlink data and a sequence number of a time unit for feeding back the first codebook; and
   sending the first codebook in the first feedback time unit.

2. The method according to claim 1, wherein at least one of time domain resources for repeatedly transmitting the first downlink data K times does not belong to the first time domain resource set, and lengths of the K time domain resources are the same.

3. The method according to claim 1, wherein transmission configuration indicators (TCIs) corresponding to at least two of time domain resources for repeatedly transmitting the first downlink data K times have different values.

4. The method according to claim 1, wherein M is equal to a maximum quantity of non-overlapping time domain resources comprised in the first time domain resource set, and each downlink data occasion in the first downlink data occasion set corresponds to at least one of the N time domain resources.

5. The method according to claim 1, wherein the first time domain resource belongs to at least one time domain resource corresponding to the first downlink data occasion.

6. The method according to claim 1, wherein the generating a first codebook based on first feedback information, the first downlink data occasion, and the first downlink data occasion set comprises:
generating a first feedback sequence based on the first downlink data occasion set, wherein each feedback location in the first feedback sequence has a correspondence with a downlink data occasion in the first downlink data occasion set; and
adding the first feedback information to a feedback location, in the first feedback sequence, corresponding to the first downlink data occasion, to generate the first codebook.

7. A method for receiving hybrid automatic repeat request acknowledgement/negative acknowledgement information, comprising:
determining a first downlink data occasion set based on a first time domain resource set, wherein the first time domain resource set comprises N time domain resources, the first downlink data occasion set comprises M downlink data occasions, both N and M are integers, N≥1, M≥1, and M≤N;
determining a first downlink data occasion based on a first time domain resource, wherein the first time domain resource is a start time domain resource for repeatedly transmitting first downlink data K times in a time unit, the first time domain resource is any one of the N time domain resources, the first downlink data occasion is any one of the M downlink data occasions, K is an integer, and K≥2;
determining a first feedback time unit based on a first offset, wherein the first offset is a difference between a sequence number of a time unit for transmitting the first downlink data and a sequence number of a time unit for feeding back a first codebook, the first codebook is determined based on first feedback information, the first downlink data occasion, and the first downlink data occasion set, and the first feedback information indicates whether a decoding result of the first downlink data is correct; and
receiving the first codebook in the first feedback time unit based on the first downlink data occasion set and the first downlink data occasion.

8. The method according to claim 7, wherein at least one of time domain resources for repeatedly transmitting the first downlink data K times does not belong to the first time domain resource set, and lengths of the K time domain resources are the same.

9. The method according to claim 7, wherein transmission configuration indicators (TCIs) corresponding to at least two of time domain resources for repeatedly transmitting the first downlink data K times have different values.

10. The method according to claim 7, wherein M is equal to a maximum quantity of non-overlapping time domain resources comprised in the first time domain resource set, and each downlink data occasion in the first downlink data occasion set corresponds to at least one of the N time domain resources.

11. The method according to claim 7, wherein the first time domain resource belongs to at least one time domain resource corresponding to the first downlink data occasion.

12. The method according to claim 7, wherein the generating a first codebook based on first feedback information, the first downlink data occasion, and the first downlink data occasion set comprises:
generating a first feedback sequence based on the first downlink data occasion set, wherein each feedback location in the first feedback sequence has a correspondence with a downlink data occasion in the first downlink data occasion set; and
adding the first feedback information to a feedback location, in the first feedback sequence, corresponding to the first downlink data occasion, to generate the first codebook.

13. A communication apparatus, comprising:
a processor, configured to determine a first downlink data occasion set based on a first time domain resource set, wherein the first time domain resource set comprises N time domain resources, the first downlink data occasion set comprises M downlink data occasions, both N and M are integers, N≥1, M≥1, and M≤N;
the processor, configured to determine a first downlink data occasion based on a first time domain resource, wherein the first time domain resource is a start time domain resource for repeatedly transmitting first downlink data K times in a time unit, the first time domain resource is any one of the N time domain resources, the first downlink data occasion is any one of the M downlink data occasions, K is an integer, and K≥2;
the processor, configured to generate a first codebook based on first feedback information, the first downlink data occasion, and the first downlink data occasion set, wherein the first feedback information indicates whether a decoding result of the first downlink data is correct;
the processor, configured to determine a first feedback time unit based on a first offset, wherein the first offset is a difference between a sequence number of a time unit for transmitting the first downlink data and a sequence number of a time unit for feeding back the first codebook; and
a transmitter, configured to send the first codebook in the first feedback time unit.

14. The apparatus according to claim 13, wherein at least one of time domain resources for repeatedly transmitting the first downlink data K times does not belong to the first time domain resource set, and lengths of the K time domain resources are the same.

15. The apparatus according to claim 13, wherein transmission configuration indicators (TCIs) corresponding to at least two of time domain resources for repeatedly transmitting the first downlink data K times have different values.

16. The apparatus according to claim 13, wherein M is equal to a maximum quantity of non-overlapping time domain resources comprised in the first time domain resource set, and each downlink data occasion in the first downlink data occasion set corresponds to at least one of the N time domain resources.

17. A communication apparatus, comprising at least one processor and a memory storing instructions that, when executed by the at least one processor, cause the communication apparatus to perform operations comprising:
determining a first downlink data occasion set based on a first time domain resource set, wherein the first time domain resource set comprises N time domain resources, the first downlink data occasion set comprises M downlink data occasions, both N and M are integers, N≥1, M≥1, and M≤N;

determining a first downlink data occasion based on a first time domain resource, wherein the first time domain resource is a start time domain resource for repeatedly transmitting first downlink data K times in a time unit, the first time domain resource is any one of the N time domain resources, the first downlink data occasion is any one of the M downlink data occasions, K is an integer, and K≥2;

determining a first feedback time unit based on a first offset, wherein the first offset is a difference between a sequence number of a time unit for transmitting the first downlink data and a sequence number of a time unit for feeding back a first codebook, the first codebook is determined based on first feedback information, the first downlink data occasion, and the first downlink data occasion set, and the first feedback information is information indicating whether a decoding result of the first downlink data is correct; and receiving the first codebook in the first feedback time unit based on the first downlink data occasion set and the first downlink data occasion.

18. The apparatus according to claim 17, wherein at least one of time domain resources for repeatedly transmitting the first downlink data K times does not belong to the first time domain resource set, and lengths of the K time domain resources are the same.

19. The apparatus according to claim 17, wherein transmission configuration indicators (TCIs) corresponding to at least two of time domain resources for repeatedly transmitting the first downlink data K times have different values.

20. The apparatus according to claim 17, wherein M is equal to a maximum quantity of non-overlapping time domain resources comprised in the first time domain resource set, and each downlink data occasion in the first downlink data occasion set corresponds to at least one of the N time domain resources.

* * * * *